US009449031B2

(12) United States Patent
Barrus et al.

(10) Patent No.: US 9,449,031 B2
(45) Date of Patent: Sep. 20, 2016

(54) SORTING AND FILTERING A TABLE WITH IMAGE DATA AND SYMBOLIC DATA IN A SINGLE CELL

(71) Applicants: John W. Barrus, Menlo Park, CA (US); Edward L. Schwartz, Menlo Park, CA (US)

(72) Inventors: John W. Barrus, Menlo Park, CA (US); Edward L. Schwartz, Menlo Park, CA (US)

(73) Assignee: Ricoh Company, Ltd., Tokyo (JP)

( * ) Notice: Subject to any disclaimer, the term of this patent is extended or adjusted under 35 U.S.C. 154(b) by 168 days.

(21) Appl. No.: 13/781,728

(22) Filed: Feb. 28, 2013

(65) Prior Publication Data
US 2014/0244668 A1 Aug. 28, 2014

(51) Int. Cl.
G06F 7/00 (2006.01)
G06F 17/30 (2006.01)
G06F 17/24 (2006.01)

(52) U.S. Cl.
CPC ....... G06F 17/30289 (2013.01); G06F 17/243 (2013.01)

(58) Field of Classification Search
USPC .......................................................... 707/752
See application file for complete search history.

(56) References Cited

U.S. PATENT DOCUMENTS

| | | | | | |
|---|---|---|---|---|---|
| 5,319,745 | A | * | 6/1994 | Vinsonneau | G06K 9/00 707/E17.009 |
| 5,632,009 | A | * | 5/1997 | Rao | G06F 3/023 715/201 |
| 5,717,939 | A | * | 2/1998 | Bricklin | G06F 17/211 345/173 |
| 6,613,099 | B2 | * | 9/2003 | Crim | 715/210 |
| 6,952,803 | B1 | * | 10/2005 | Bloomberg | G06F 17/211 382/186 |
| 7,356,525 | B2 | * | 4/2008 | Cipriano | G06F 17/30454 707/722 |
| 2001/0011282 | A1 | * | 8/2001 | Katsumata | G06F 17/243 715/234 |
| 2002/0067854 | A1 | | 6/2002 | Reintjes et al. | |
| 2002/0073089 | A1 | * | 6/2002 | Schwartz | G06F 17/3056 |
| 2003/0076995 | A1 | * | 4/2003 | Morita | G06Q 40/00 382/181 |
| 2003/0152277 | A1 | * | 8/2003 | Hall, Jr. | G06K 9/033 382/229 |
| 2004/0061702 | A1 | * | 4/2004 | Kincaid | G06T 11/206 345/440 |
| 2004/0122794 | A1 | * | 6/2004 | Gwizdaloski | 707/1 |
| 2005/0231746 | A1 | | 10/2005 | Parry et al. | |
| 2005/0255439 | A1 | | 11/2005 | Cody | |
| 2006/0044619 | A1 | * | 3/2006 | Namiki | G06F 17/242 358/3.28 |

(Continued)

OTHER PUBLICATIONS

Final Office Action for U.S. Appl. No. 13/414,713, dated Feb. 6, 2014, 11 pages.

*Primary Examiner* — Tony Mahmoudi
*Assistant Examiner* — Michael Le
(74) *Attorney, Agent, or Firm* — Patent Law Works LLP

(57) ABSTRACT

An Image Based Document Management (IBDM) server includes a table generator, a symbolic representation module and a sort engine. The table generator generates a table from the form images, the table comprising cells with data types including image data, symbolic data, image and symbolic data and an empty value, and updates the table. The symbolic representation module converts at least one of the cells with image data to symbolic data. The sort engine determines, from a sort request for a column of the table received from a user, at least a first priority for a first data type, the column including at least two of the data types, determines from the sort request a second priority within one of the data types, and sorts the column according to the sort request.

20 Claims, 18 Drawing Sheets

(56) References Cited

U.S. PATENT DOCUMENTS

| | | |
|---|---|---|
| 2006/0088214 A1 | 4/2006 | Handley et al. |
| 2007/0168382 A1* | 7/2007 | Tillberg ............ G06F 17/30253 |
| 2008/0065685 A1 | 3/2008 | Frank |
| 2009/0148049 A1* | 6/2009 | Ozawa .................. G06F 17/243 |
| | | 382/195 |
| 2009/0164915 A1* | 6/2009 | Gasn et al. ................... 715/753 |
| 2010/0008578 A1* | 1/2010 | Eguchi ............... G06K 9/00449 |
| | | 382/175 |
| 2010/0150397 A1 | 6/2010 | Handley et al. |
| 2010/0246999 A1 | 9/2010 | Tillberg et al. |
| 2012/0189203 A1* | 7/2012 | Lin et al. ...................... 382/181 |
| 2012/0260237 A1* | 10/2012 | Duddles .................... G06F 8/10 |
| | | 717/139 |
| 2013/0238966 A1* | 9/2013 | Barrus ............... G06K 9/00449 |
| | | 715/223 |
| 2013/0238968 A1 | 9/2013 | Barrus |
| 2014/0245120 A1* | 8/2014 | Schwartz ........... G06K 9/00402 |
| | | 715/226 |

\* cited by examiner

| Image | Symbolic | Note |
|---|---|---|
| Nov 29/12 | Nov 29, 2012 | Handwritten field (date) |
| ○ | FALSE | Unselected radio button |
| ⊙ | TRUE | Selected radio button |
| ✗ | X | Handwritten field (x) |
| 333@tyb.com | 333@tyb.com | Handwritten field (email address) |

| Label | Image | Symbolic |
|---|---|---|
| Date | 7/1/2013 | |
| Name | Oscar Mike | Oscar Mike |
| Company Name | PQR | PQR |
| To see | Leonardo | Leonardo |
| Name of Country | Canada | Canada |
| Signature | | |
| Photo | | |
| Email | mike@pqr.com | mike@pqr.com |
| US | | U.S. Citizen or Per. Res. |
| Other | ◉ | Foreign National |
| Original Date | | 1/7/2013 01:00:24 PM |
| Last Stroke Date | | 1/7/2013 01:02:10 PM |
| First Stroke Date | | 1/7/2013 12:59:15 PM |
| Median Stroke Date | | 1/7/2013 01:01:35 PM |
| User Name | | Joe |
| User ID | | 24254 |

XYZ  Visitor Registration

Date:
7/1/2013

Name:
Oscar Mike

Company Name:
PQR

To See:
Leonardo

Email Address *(tap field below to input using soft keyboard)*:
oscar.mike@pqr.com

*For U.S. Export Compliance purpose we ask that you indicate your nationality:*

○ U.S. Citizen or Permanent Resident

● Foreign National

Name of Country: Canada

Signature: *[signature]*

*Thank you for visiting XYZ company, inc.*

Figure 3E

| Document Management | | | | | | | | | |
|---|---|---|---|---|---|---|---|---|---|
| Open Close Preferences Fit 100% Blank Form Exit | | | | | | | | | |
| Blank Form | Spreadsheet | Forms | Single Form - Edit | | | | | | |
| 18 rows | | | Mode: Symbolic | | Auto Refresh: Off | | View | Unsaved View ▶ ▼ ◀ | |
| ☐ | ☐ | ☐ | ☐ | ☐ | ☐ | ☐ | ☐ | ☐ | ☐ |
| Date | Name | Company Name | To See | Name of Country | Signature | Photo | Email | US Citizen or Per. Res. | Foreign Nat. | Original date |
| 7/8/13 | LeRoy Tinne | HWSK | Hemler | | Joey | 🔍 | leroy@hwsk.com | US | | 1/7/2013 10:25:54 PM |
| 7/1/2013 | Oscar Mike | PQR | Leonard | Canada | | 👤 | mike@pqr.com | | Foreign National | 1/7/2013 01:00:24 PM |
| 9/1/2013 | Tom Wild | T&B | Nathan | Canada | | 👤 | wild@lb.ca | | Foreign National | 1/9/2013 04:15:20 PM |
| 10/1/2013 | Brooke Green | xyz | Massy | | | 👤 | bg@xyz.com | US | | 1/10/2013 11:19:10 AM |
| 10/1/2013 | Elisha | herald | Kelly | | | 👤 | el@hrld.com | US | | 1/10/2013 12:45:55 PM |
| 11/1/2013 | Jazz Mayin | TPM | Kevin | Poland | | 👤 | jaz@tpm.com | | Foreign National | 1/11/2013 09:05:23 AM |
| 13/1/2013 | LeRoy McKay | Z studios | Leonard | Canada | | 👤 | roy@zstu.com | | Foreign National | 1/13/2013 10:35:53 AM |
| 14/1/2013 | Elaine Gomez | | Lucy | | | 👤 | gom@abc.com | US | | 1/14/2013 11:33:19 AM |

Image & symbolic data ☐        Dates All ▼        Apply

SORTING AND FILTERING A TABLE WITH IMAGE DATA AND SYMBOLIC DATA IN A SINGLE CELL

BACKGROUND OF THE INVENTION

1. Field of the Invention

The specification relates to processing of forms. In particular, the specification relates to generating a table and sorting and filtering a column of the table, where one or more cells in the column include both image data and symbolic data.

2. Description of the Background Art

As the use of portable computing devices becomes common, many users input information into a form by using a stylus or a fingertip on the portable computing devices. For example, a user inputs data with the stylus using a soft keyboard. The symbolic data captured using a soft keyboard in a form is typically submitted to a database where each form becomes a row in a table and the data is captured in the columns of the table. These tables in the database are then sorted and filtered according to the text or symbolic data in the cells. This approach, however, does not work if the cells in the column include images. As a result, these tables have limited usefulness.

Typically columns in databases contain only a single type of data, a string, a date, a number or a uniform resource locator (URL). These can be sorted and filtered using standard sorting and filtering techniques because they are all a type of symbolic data with an inherent ordering. If images were added to a column containing symbolic text, there is no way to order the images and the text together.

Other systems exist for querying images, however, the images are ranked according to text and metadata related to the image and not from the image itself. As a result, this approach cannot be used for organizing images in isolation.

SUMMARY OF THE INVENTION

The disclosure overcomes the deficiencies of the prior art with a system for sorting and filtering a table that includes one or more cells with both image data and symbolic data. In one embodiment, an Image Based Document Management (IBDM) server includes a table generator, a symbolic representation module, a sort engine and a user interface engine. The table generator generates a table from the form images, the table comprising cells with data types including image data, symbolic data, image & symbolic data and an empty value, and updates the table. The symbolic representation module converts at least one of the cells with image data to symbolic data and adds the symbolic data to the cell. The sort engine determines, from a sort request for a column of the table received from a user, at least a first priority for a first data type, the column including at least two of the data types, determines from the sort request a second priority within one of the data types, and sorts the column according to the sort request. The user interface engine displays the table to the user and receives the sort request from the user.

The IBDM server also includes a filter engine for filtering a column of the table in response to receiving a filter request from a user. In one embodiment, the filter engine filters the column by identifying filter criteria from the filter request, the filter criteria being based on a data type or characteristics of data, applying the filter criteria to the column by eliminating rows that do not match the filter criteria, and displaying remaining rows in the table to the user.

Other aspects include corresponding methods, systems, apparatuses, and computer program products for these and other innovative aspects.

The system advantageously sorts and filters a table that includes image & symbolic data. As a result, the system can be used to quickly organize data from one or more users without requiring the expensive process of transcribing all cells with image data to symbolic representations. The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

FIG. 3A is a graphic representation of an example table that includes image data and symbolic data.

FIG. 3B is a graphic representation of an example table that illustrates conversion of image data to symbolic data.

FIG. 3E is a graphic representation of an example visitor registration form.

FIG. 3F is a graphic representation of an example table of a plurality of form images.

FIG. 6B is a graphic representation of an example table that includes a menu for sorting a column of a table.

FIG. 6C is an example of a graphical representation of sorting options for the image data type.

FIG. 7A is a graphic representation of an example table that includes a menu for filtering a column of a table.

DETAILED DESCRIPTION OF THE PREFERRED EMBODIMENTS

Figure 1:
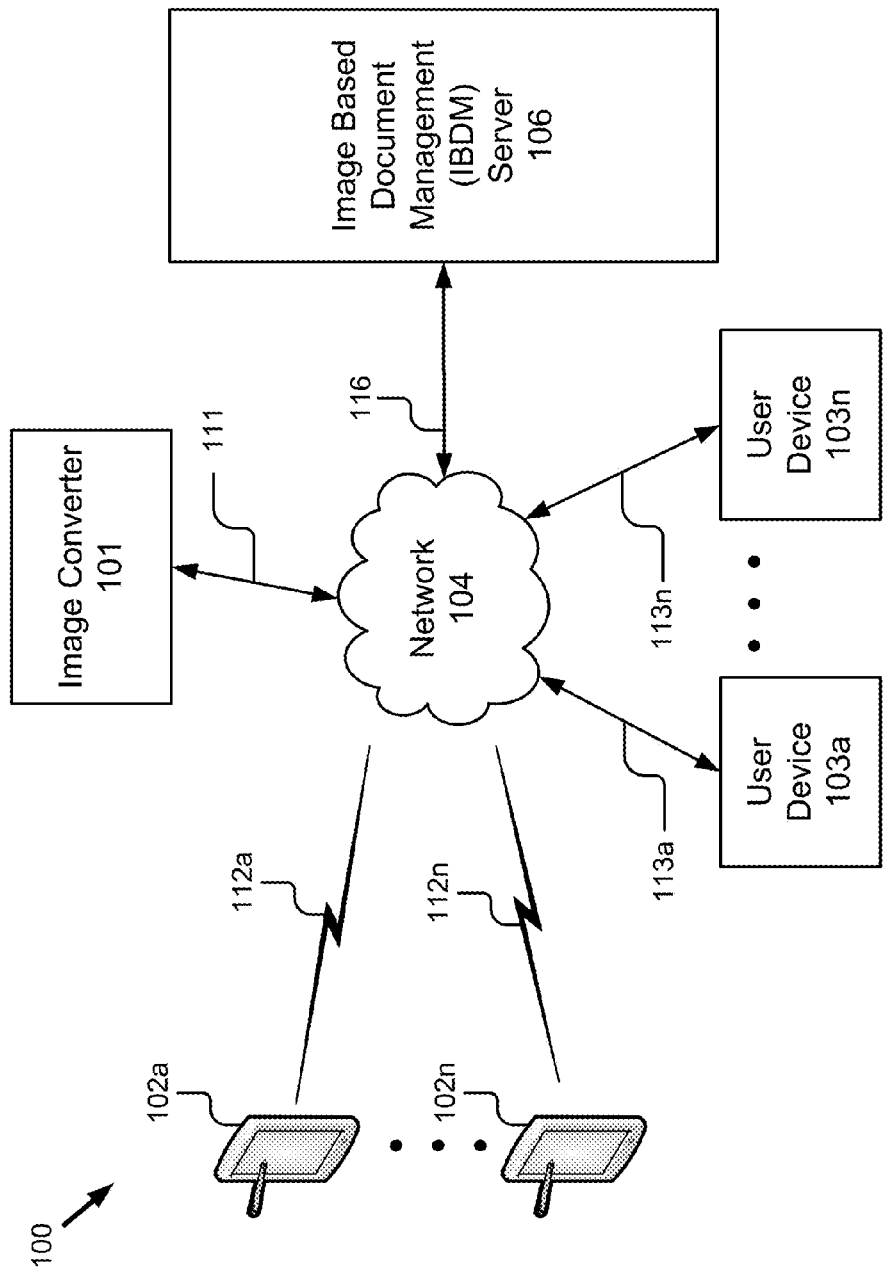
FIG. 1 is a high-level block diagram illustrating one embodiment of a system for sorting and filtering a column of a table.

A description of a system and method for sorting and filtering a table that includes one or more cells with both image data and symbolic data follows. For purposes of explanation, numerous specific details are set forth in order to provide a thorough understanding of the invention. It will be apparent, however, to one skilled in the art that the embodiments can be practiced without these specific details. In other instances, structures and devices are shown in block diagram form in order to avoid obscuring the invention. For example, the invention is described in one embodiment below with reference to user devices such as a smart phone and particular software and hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this invention, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1 illustrates a block diagram of a system 100 for sorting and filtering a table that includes one or more cells with both image data and symbolic data. The system 100 includes an image converter 101, portable computing devices 102a-102n, user devices 103a-103n and an Image Based Document Management (IBDM) server 106 that are each communicatively coupled to the network 104. In FIG. 1 and the remaining figures, a letter after a reference number, such as "102a" is a reference to the element having that particular reference number. A reference number in the text without a following letter, such as "102," is a general reference to any or all instances of the element bearing that reference number.

The network 104 is a conventional type, wired or wireless, and may have any number of configurations such as a star configuration, token ring configuration or other configurations known to those skilled in the art. Furthermore, the network 104 may comprise a local area network (LAN), a wide area network (WAN) (e.g., the Internet), and/or any other interconnected data path across which multiple devices may communicate. In yet another embodiment, the network 104 may be a peer-to-peer network. The network 104 may also be coupled to or includes portions of a telecommunications network for sending data in a variety of different communication protocols. In yet another embodiment, the network 104 includes Bluetooth communication networks or a cellular communications network for sending and receiving data such as via short messaging service (SMS), multimedia messaging service (MMS), hypertext transfer protocol (HTTP), direct data connection, wireless application protocol (WAP), email, etc. While only one network 104 is coupled to the plurality of user devices 103a-103n, the plurality of portable computing devices 102a-102n and the IBDM server 106, in practice any number of networks 104 can be connected to the entities.

The portable computing devices 102a-102n are each wirelessly coupled to the network 104 via signal lines 112a-112n respectively. The portable computing device 102 is any computing device including a memory, a processor and wireless communication capability. For example, the portable computing device 102 can be a tablet computer, a personal digital assistant, a smart phone, etc. The portable computing device 102 is adapted to receive form images, add strokes to the form images and send the form images including the strokes to the image converter 101 or the IBDM server 106. A form is any document that includes fields (i.e., blank spaces) for insertion of requested information. The form when filled out with the requested information may be a statement, an order, a request, etc. For example, a form can be a tax form, an insurance form, a medical form, an electronic check, a job application, a survey, a receipt, etc.

In one embodiment, the portable computing device 102 is a tablet computer including a computing pad and a stylus. The computing pad is adapted to display a form image and capture any strokes written on the form image using the stylus or the user's fingertip. The strokes are typically displayed on top of the image, just as if written by pen on paper. The computing pad usually captures the strokes as a sequence of points or segments along with location, timing and pressure information. The computing pad sends the form images including the captured strokes in any format known to persons of ordinary skill in the art, for example, Scalable Vector Graphics (SVG) file format, which can contain both strokes and images. In one embodiment, the computing pad attaches the information associated with the strokes, for example, the location and timing information with the form images as metadata. The portable computing device 102 determines location information by using global positioning system (GPS) circuitry or accessing a database including media access control (MAC) addresses of local wireless access points. In one embodiment, the captured strokes are saved in a stroke format known to any person of ordinary skill in the art, including Scalable Vector Graphics (SVG) or Ink Markup Language (InkML).

The image converter 101 is coupled to the network 104 via signal line 111. The image converter 101 is adapted to receive form images including strokes directly from the portable computing device 102 or indirectly from the IBDM server 106. The image converter 101 optionally converts the strokes to symbolic data and sends the symbolic data back to the IBDM server 106. The symbolic data includes machine encoded text such as Universal Character Set Transformation Format-8-bit (UTF-8). The symbolic data may have semantic meaning like the words "true" and "false," which have meaning beyond the characters used in the words. The symbolic data will be described in more detail with reference to FIG. 2. In one embodiment, the image converter 101 is a human-in-the-loop (HITL) system such as the Mechanical Turk system provided by Amazon®. For example, a user accessing the user device 103 interacts with the Mechanical Turk system over the network 104 to convert handwriting on a form to Unicode text (e.g. UTF-8). In one embodiment, the image converter 101 saves both strokes and symbolic data converted from the strokes with the form images, and sends the form images, strokes and symbolic data to the IBDM server 106.

The user devices 103a-103n are each coupled to the network 104 via the signal lines 113a-113n respectively. The user device 103 is any computing device that includes a memory and a processor, for example, a desktop computer, a laptop computer, etc. The user device 103 is adapted to send and receive data to and from the IBDM server 106. For example, the user device 103 sends a request to view a table and/or to modify the table to the IBDM server 106. The user device 103 is accessed by users that have permission to access information from the IBDM server 106, such as a creator of the form sent to portable computing devices 102 or an administrator of the IBDM server 106.

The IBDM server 106 is coupled to the network 104 via signal line 116. In one embodiment, the IBDM server 106 receives form images including strokes from the portable computing devices 102a-102n, generates a table from the form images, receives a sort request or a filter request from a user for sorting or filtering a column of the table, where one or more cells in the column include both image data and symbolic data, and sorts or filters the column based on the sort request or the filter request. Although only one IBDM server 106 is illustrated, persons with ordinary skill in the art will recognize that any number of IBDM servers 106 can be coupled to the network 104. The IBDM server 106 is described in further detail below with reference to FIG. 2.

Image Based Document Management (IBDM) Server 106

Figure 2:
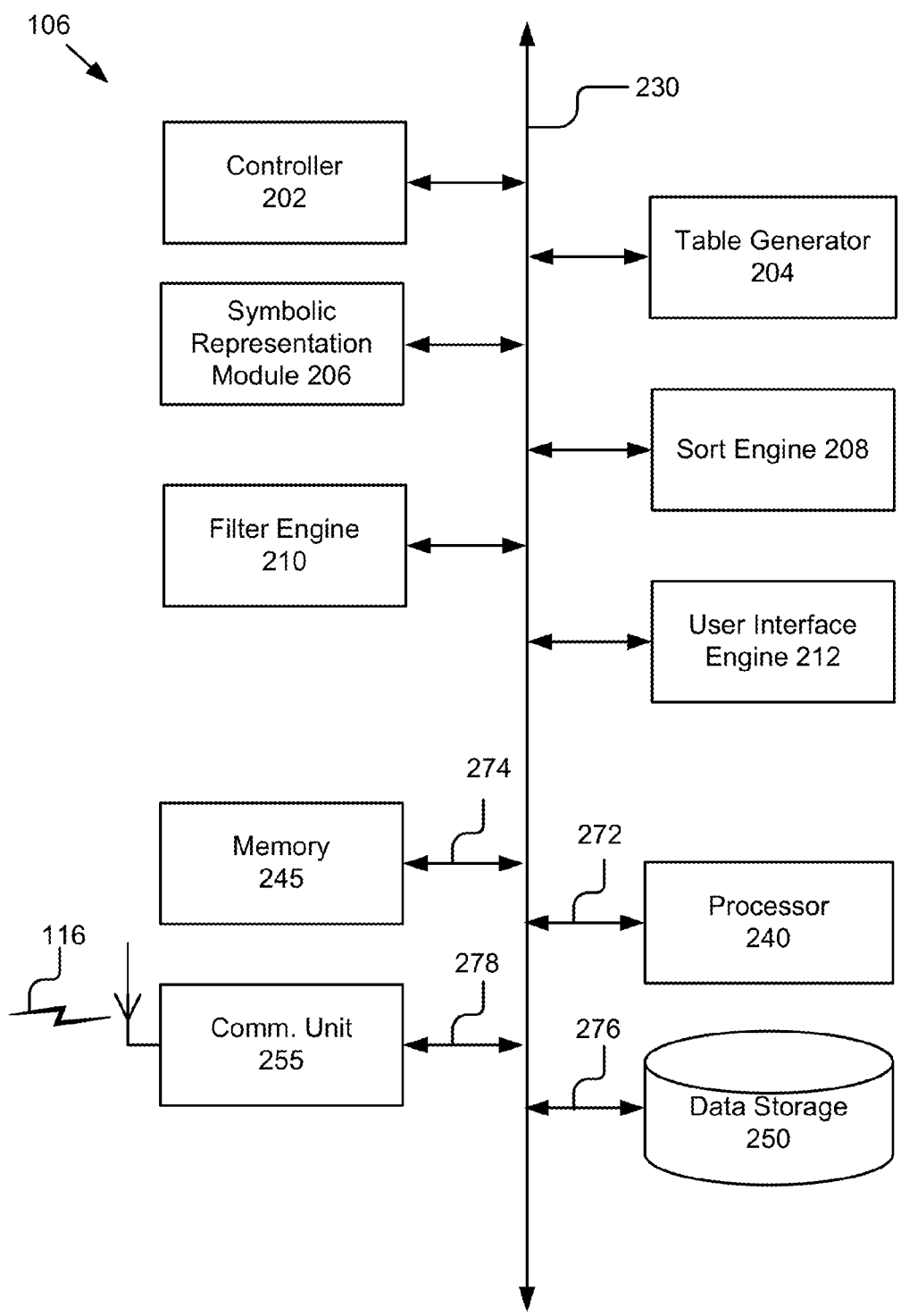
FIG. 2 is a block diagram illustrating one embodiment of an Image Based Document Management (IBDM) server in more detail.

Referring now to FIG. 2, the Image Based Document Management Server (IBDM) server 106 is shown in more detail. FIG. 2 is a block diagram of the IBDM server 106 that includes a controller 202, a table generator 204, a symbolic representation module 206, a sort engine 208, a filter engine 210, a user interface engine 212, a processor 240, a memory 245, a communication unit 255 and data storage 250.

The processor 240, the memory 245, the communication unit 255 and the data storage 250 are communicatively coupled to the bus 230. The bus 230 may represent one or more buses including an industry standard architecture (ISA) bus, a peripheral component interconnect (PCI) bus, a universal serial bus (USB), or some other bus known in the art to provide similar functionality.

The processor 240 comprises an arithmetic logic unit, a microprocessor, a general purpose controller or some other processor array to perform computations and provide electronic display signals to a display device. The processor 240 is coupled to the bus 230 for communication with the other components via signal line 272. Processor 240 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 245 stores instructions and/or data that may be executed by processor 240. The memory 245 is coupled to the bus 230 for communication with the other components via signal line 274. The instructions and/or data may comprise code for performing any and/or all of the techniques described herein. The memory 245 may be a dynamic random access memory (DRAM) device, a static random access memory (SRAM) device, flash memory or some other memory device known in the art. In one embodiment, the memory 245 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis.

The communication unit 255 is hardware for receiving and transmitting data by linking the processor 240 to the network 104 and other processing systems. The communication unit 255 receives data such as requests from the user device 103 and transmits the requests to the table generator 204, for example a request for querying a table. The communication unit 255 also receives information, such as form images, from the portable computing device 102. The communication unit 255 transmits the table to the user device 103, for example, the modified table in response to a query. The communication unit 255 is coupled to the bus 230 via signal line 278.

In one embodiment, the communication unit 255 includes a port for direct physical connection to the user device 103, the portable computing device 102 or to another communication channel. For example, the communication unit 255 includes an RJ45 port or similar port for wired communication with the user device 103. In another embodiment, the communication unit 255 includes a wireless transceiver 116 for exchanging data with the user device 103, the portable computing device 102 or any other communication channel using one or more wireless communication methods, such as IEEE 802.11, IEEE 802.16, Bluetooth® or another suitable wireless communication method.

In yet another embodiment, the communication unit 255 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 255 includes a wired port and a wireless transceiver. The communication unit 255 also provides other conventional connections to the network 104 for distribution of files and/or media objects using standard network protocols such as TCP/IP, HTTP, HTTPS and SMTP as will be understood to those skilled in the art.

The data storage 250 is a non-transitory memory that stores information associated with a plurality of form images received from the portable computing devices 102a-102n. For example, the data storage 250 stores form images, a table generated from the form images, sort requests and filter requests received from users for sorting or filtering one or more columns of the table and results for sorting or filtering the one or more columns of the table. The data storage 250 is coupled to the bus 230 for communication with the other components via signal line 276.

The controller 202 is software and routines for receiving data via the communication unit 255, routing the data to the appropriate components and transmitting responses from components to the communication unit 255 for transmitting to the user device 103 and other components of the system 100. In one embodiment, the controller 202 is a set of instructions executable by the processor 240 to provide the functionality described below for managing data transfer between the components of the IBDM server 106 and other components of the system 100. In another embodiment, the controller 202 is stored in the memory 245 and is accessible and executable by the processor 240. In either embodiment, the controller 202 is adapted for cooperation and communication with the processor 240, the communication unit 255 and other components of the IBDM server 106.

Within this specification, stroke data is captured from forms as a sequence of points, line segments or curves, optionally including pressure, time and acceleration information associated with the strokes. For convenience, the strokes are frequently converted to images, but the images can include metadata about the strokes, like pressure or time data. The metadata could be included within the image or associated with the image in other ways. Stroke data and image data are frequently used interchangeably to refer to the data captured as strokes on the portable computing device 102.

The table generator 204 is software and routines for generating a table associated with a set of form images. In one embodiment, the table generator 204 is a set of instructions executable by the processor 240 to provide the functionality described below for generating the table. In another embodiment, the table generator 204 is stored in the memory 245 and is accessible and executable by the processor 240. In either embodiment, the table generator 204 is adapted for cooperation and communication with the processor 240, the communication unit 255 and other components of the IBDM server 106.

The table generator 204 receives a set of form images that include strokes from the portable computing devices 102 via the controller 202, generates images of fields and labels from the set of form images that include strokes and generates a table that includes the images of fields and labels. For ease of understanding, future references to form images will be understood to be form images that also include stroke data from the completed forms. In one embodiment, the table generator 204 generates a field image by identifying a group of strokes in a form image, determining a bounding box that encompasses the group of strokes and determining the field image from the form image based on the bounding box. In some embodiments the table generator 204 generates a label image by analyzing an area around a field image, identifying a group of related pixels as a label for the field image and cropping the label image from the form image.

The table generator 204 generates a table associated with the set of form images based on field images and label images created from the forms. In one embodiment, the table generator 204 automatically generates a table by designating each label image as a column header of the table and populating each column with field images that are associated with each label image. In other embodiments, a user defines the labels or the label is identified based on a form identifier and a location of field images. In some embodiments, the table generator 204 also extracts metadata associated with the set of form images and incorporates the metadata into one or more columns of a table. For example, the table generator 204 extracts the date of when a form was filled out and adds a date column to the table.

In addition to determining field images and label images that are included in a table, the table generator 204 also determines an order of the field images and label images and organizes the field images and label images according to that order. For example, the table generator 204 generates a table from visitor registration forms filled by users such as Jane and Alice. The table generator 204 places "Jane" in a field above "Alice" in a "Name" column in the table because the metadata associated with the visitor registration forms filled by Jane and Alice indicate that Jane filled in the form earlier than Alice. The table generator 204 also arranges the "Name" column as the first column of the table because the image of "Name" is located on the top of the visitor registration forms filled by the users. Persons with ordinary skill in the art will recognize that the table generator 204 can arrange the field images and label images in a table in different orders.

The content in each cell in the table includes potentially four states: an empty value, image data, symbolic data or a combination of both symbolic and image data (referred to as image & symbolic data to distinguish it from image data and symbolic data). The content in a cell in the table may include an empty value. For example, a cell includes an empty value if no information is provided by a user in a field of a form, or in other words, if the user provides no strokes for a particular field in a form. The content in field images and label images also includes image data. FIG. 3A depicts examples of image data. The first column (e.g., the image column) of FIG. 3A shows the image data that includes handwritten data (e.g., a handwritten date, a handwritten "x," a handwritten email address) and a radio button (e.g., an unselected radio button and a selected radio button). The handwritten data can be strokes captured when a user fills a form using a stylus or a fingertip on the portable computing device 102. The radio button is an image chosen in response to user selection or no user selection.

The content in a cell represented by field images optionally includes symbolic data. For example, each of the set of forms that is used to generate the field images and the label images includes a time stamp that indicates when a form was submitted. In one embodiment, the table generator 204 also receives symbolic data from the image converter 101. The image converter 101 or the symbolic representation module 206 converts image data in the set of forms to symbolic data. For example, the second column (e.g., the symbolic column) of FIG. 3A shows the symbolic data corresponding to the image data in the first column such as printed text for the handwritten date and email address included in the first column. In another embodiment, the table generator 204 transmits image data to the symbolic representation module 206 for converting the image data to symbolic data. In another example, the user inputs symbolic data using a soft keyboard.

In one embodiment, the table generator 204 associates the symbolic data received from the image converter 101 or the symbolic representation module 206 with the image data from which the symbolic data is generated. The table generator 204 saves both the symbolic data and the image data in a single cell as image & symbolic data associated with the field.

The symbolic representation module 206 is software and routines for generating symbolic representations for image data in the table. In one embodiment, the symbolic representation module 206 is a set of instructions executable by the processor 240 to provide the functionality described below for generating symbolic representations. In another embodiment, the symbolic representation module 206 is stored in the memory 245 and is accessible and executable by the processor 240. In either embodiment, the symbolic representation module 206 is adapted for cooperation and communication with the processor 240, the communication unit 255 and other components of the IBDM server 106.

In one embodiment, the symbolic representation module 206 receives image data in field images or label images from the table generator 204 and generates symbolic data corresponding to the image data using, for example, Optical Character Recognition (OCR), Optical Mark Recognition (OMR), intelligent character recognition (ICR), handwriting recognition, pattern recognition, etc. For example, the symbolic representation module 206 performs handwriting recognition to get the name "Amy" from the handwritten version of her name.

In another embodiment, the symbolic representation module 206 transmits the image data included in a table to a user over the network 104 and the user manually converts the image data to symbolic data. FIG. 3B depicts an example where a user manually converts Oscar Mike's handwriting to symbolic data. For instance, the user inputs a company name "PQR" in the "Symbolic" column (e.g., using a computer keyboard) to correspond to his handwriting of the company name in the "Image" column (e.g., strokes on a tablet). When manually converting image data to symbolic data, the user can select which portion of the image data to convert and which symbolic data is preferred. In FIG. 3B, the user chooses not to convert a handwritten date to a symbolic date. The user can also choose to input a symbolic representation of the name as "Oscar C. Mike" instead of "Oscar Mike" shown in FIG. 3B. The symbolic representation module 206 saves computing time and expense by converting the image data in part of a column rather than the image data in the entire column to symbolic data.

In yet another embodiment, the symbolic representation module 206 classifies image data in a table to generate symbolic data. In one embodiment, the symbolic representation module 206 receives image data (e.g., strokes) included in field and label images in a column of a table, determines similarities among the image data in the column, classifies the image data in the column into K (e.g., one, two, three, . . . ) groups based on the similarities (e.g., by creating a hierarchical cluster), represents each group with classification data and uses the classification data as the symbolic data. In one embodiment, the symbolic representation module 206 extracts an example stroke from each group of the K groups and converts the example stroke to classification data. Although a group may contain different strokes, the symbolic representation module 206 selects a single example stroke and provides a single classification to represent the group.

Figure 3C:
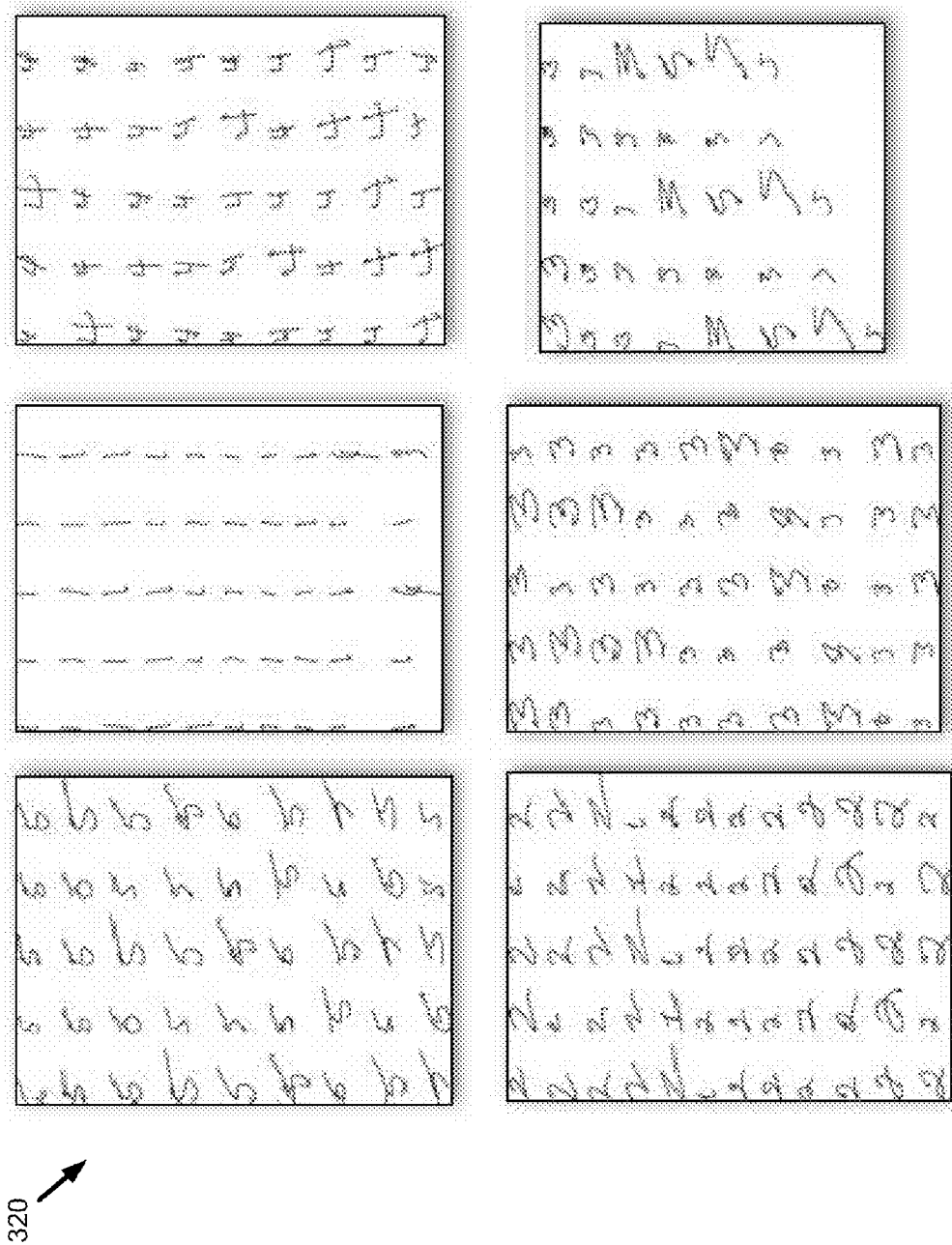
FIG. 3C is a graphic representation of groups generated by classifying image data in a column of a table.

FIG. 3C depicts an example of classifying image data to obtain symbolic data. The symbolic representation module 206 receives multiple columns of a table from the table generator 204 and converts image data (e.g., strokes) included in the multiple columns of the table to symbolic data. For example the table generator 204 generates the table from questionnaire forms filled in by multiple users. The multiple columns in the table includes a "Name" column, a "Year" column, a "Number of Pets" column, a "Number of children" column and an "Email Address" column. In the example shown in FIG. 3C, the symbolic representation module 206 classifies the strokes in a column (e.g., the "Number of Pets" column) to six groups based on the similarities among the strokes and represents each group from the top left to the bottom right with classification data A, B, C, D, E and F, respectively, without determining a specific symbolic value or meaning, but grouping the strokes based on similarity. For instance, groups E and F both contain many strokes which appear to be 3, but they are classified separately because they were written slightly differently.

The symbolic representation module 206 can generate symbolic data for a stroke in a table based on existing classification data related to the stroke instead of converting the stroke to symbolic data each time the stroke occurs, and thereby greatly reduces computing time for generating symbolic data. Using classification data for conversion is especially useful when a table includes the same type of strokes or the same strokes multiple times in multiple columns. Continuing with the above example, the symbolic representation module 206 receives the same type of strokes in the "Year" column, the "Number of Pets" column and the "Number of children" column. Once six groups are formed for the strokes in the "Number of Pets" column, the symbolic representation module 206 can use the six groups to generate symbolic data for the strokes in the "Year" column and the "Number of Children" column.

In one embodiment, the symbolic representation module 206 converts a portion of the image data included in the table from the table generator 204 to the symbolic data. Converting all of the image data would be computationally expensive and unnecessary since much of the data is legible without being converted. In one embodiment, the symbolic representation module 206 stores the symbolic data in data storage 250. In another embodiment, the symbolic representation module 206 also transmits the symbolic data to the table generator 204.

Figure 3D:
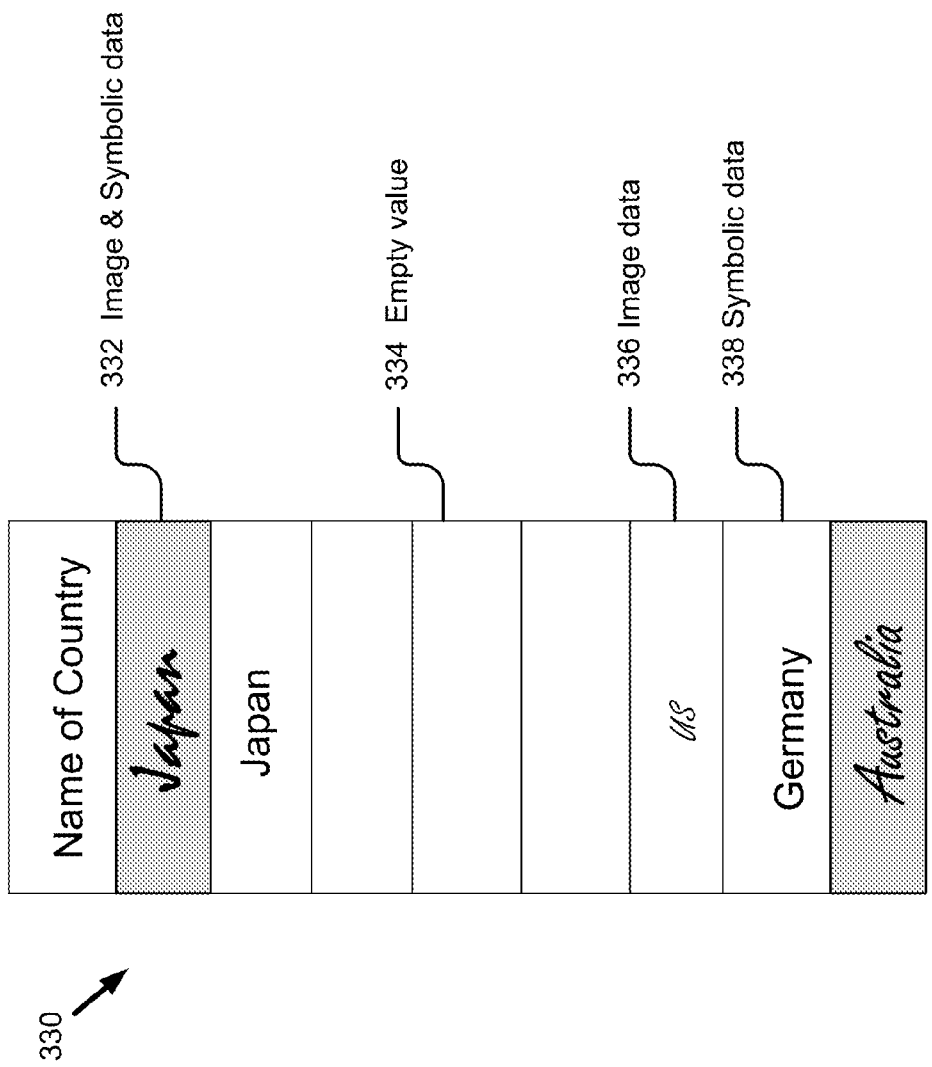
FIG. 3D is a graphic representation of an example column of a table that includes four types of data.

The table generator 204 receives symbolic data from the symbolic representation module 206, associates the symbolic data with the image data from which the symbolic data is generated and updates the table. The updated table can include four types of data, e.g., an empty value, image data, symbolic data and image & symbolic data. For example, the table generator 204 updates rows of a first column of a table (e.g., cells) such that a first cell comprises image data and a second cell comprises image & symbolic data. Referring now to FIG. 3D, it depicts a column "Name of Country" 330 of a table. Each cell in the column includes one type of data. A cell with an empty value is shown in the cell 334 in FIG. 3D. The empty value indicates that a user did not input information into the field in a form that is used for generating the table. The image data includes handwriting, objects embedded into the form (e.g., a check box), strokes and other media (e.g., a photo). For example, the cell 336 in FIG. 3D includes image data representing a handwritten "US." The image data is provided by users in the set of form images. The symbolic data includes Unicode characters. For example, the cell 338 in FIG. 3D includes symbolic data representing "Germany." The symbolic data is included in the set of form images or generated by conversion of the image data in the table using the image converter 101 or the symbolic representation module 206.

The image & symbolic data includes image data and symbolic data associated with the image data. In one embodiment, the table generator 204 communicates with the user interface engine 212 to display the image & symbolic data in a way that is different from displaying the other three types of data to highlight that the symbolic representation or image data is available, depending on which type of data is displayed. For example, the cell 332 in FIG. 3D includes image & symbolic data shown with a gray background. Other highlights are possible, such as a yellow background, underlining, a flag, an arrow, etc. In one embodiment, the table generator 204 also communicates with the user interface engine 212 to switch the display of the image data or the symbolic data contained in the image & symbolic data in response to receiving a request from a user. The process for switching the display is described in more detail below with reference to FIG. 3F.

FIG. 3E depicts an example visitor registration form 340 filled by user Oscar Mike. The form includes fields for a date, a visitor name, a company name, the name of the person visited, an email address, nationality and signature. There is also a location on the form for a photograph of the visitor that can be captured by the portable computing device 102 if the device has a camera.

FIG. 3F depicts a user interface 350 including a table 352 generated from a set of visitor registration forms including the form shown in FIG. 3E. The table generator 204 communicates with the symbolic representation module 206 to generate the table 352 that includes four data types: an empty value, image data, symbolic data and image & symbolic data. The table generator 204 then communicates with the user interface engine 212 to present the table 352 to a user in the user interface 350. The user interface 350 also includes a mode button 354. When the user selects the mode button 354, the table generator 204 communicates with the user interface engine 212 to present either the image data or the symbolic data included in the image & symbolic data for display. If the mode button 354 is in a symbolic mode, the symbolic data included in the image & symbolic data is displayed. For example, in FIG. 3F the mode button 354 is symbolic and, as a result, cell 355 is one of the shaded cells that includes both image & symbolic data that is currently displaying the symbolic data. Similarly, all nonempty cells in column 356 are displayed as symbolic data because the mode button 354 is in symbolic mode. If the mode button 354 is in an image mode, the image data included in the image & symbolic data is displayed. The user interface engine 212 does not provide the mode button 354 to control the display of other three types of data, e.g., an empty value, image data and symbolic data. For example, the user interface engine 212 displays an empty cell in the first row of the "Name of Country" column and images of signatures in the "Signature" column in the user interface 350 regardless of what mode the mode button 354 is in.

The sort engine 208 is software including routines for sorting a column of a table in response to receiving a sort request. In one embodiment, the sort engine 208 is a set of instructions executable by the processor 240 to sort the column of the table. In another embodiment, the sort engine 208 is stored in the memory 245 and is accessible and executable by the processor 240. In either embodiment, the sort engine 208 is adapted for cooperation and communication with the processor 240 and other components of the IBDM server 106.

The sort engine 208 receives a sort request for a column of a table from a user via the controller 202, determines an order based on the sort request and sorts the table in that order. The table is generated by the table generator 204 and includes multiple data types, e.g., an empty value, image data, symbolic data and image & symbolic data. At least one column in the table includes at least two of the data types.

The sort engine 208 determines at least a first priority for a data type included in the column from the sort request and arranges the data in the column based on at least the first priority. In one embodiment, the sort request includes an order specified by the user. The order determines positions of each data type in the column. In another embodiment, the sort request includes user instructions about which types of data should be separated, which type of data cannot be in the bottom of the column, etc. The sort engine 208 analyzes the sort request and determines the first priority from the analysis. The sort engine 208 sorts the data in the column in descending priorities of the data types. For example, the sort engine 208 receives sort requests for a table of which each column has ten cells. The sort engine 208 receives a first sort request to sort the "Name of Country" column in the table. As an example, this column includes ten cells: four empty cells and six cells that contain users' handwritten country names (e.g., image data obtained from users' strokes). Three of those six cells that have handwritten names have also been converted to symbolic information so that they contain both image & symbolic data. (e.g., image & symbolic data obtained by converting their handwriting to symbolic data using the symbolic representation module 206 or the image converter 101). The sort engine 208 determines priorities in a descending order for (1) image data, (2) symbolic data and (3) empty cells based on the priorities specified in the sort request. The sort engine 208 sorts the table including the "Name of Country" column and the groups image & symbolic data with the image data type and the resulting order for the first priority for data types is: (1) three cells with image data and three cells with image & symbolic data; and (2) four cells that are empty. If on the other hand, the priorities were for (1) symbolic data; (2) image data; and (3) empty cells, the image & symbolic data would be grouped with the symbolic data. Specifically, the order for the first priority would be: (1) three cells with image & symbolic data; (2) three cells with image data; and (3) four empty cells. This example will be referenced in greater detail in association with FIGS. 3F, 6A, 6B and 6C.

The sort engine 208 uses the first priority to determine a position of each data type in the column. After determining positions between each data type in the column, the sort engine 208 determines a second priority within each data type from the sort request. The sort engine 208 incorporates the first priority and the second priority to determine an order and sorts cells in the table according to both priorities.

In one embodiment, the sort engine 208 determines a second priority for the image data type based on image properties (e.g., width, height, color), stroke properties (e.g., length) and other properties (e.g., a check box is selected or unselected, which group the image data is classified into, etc.). For example, the sort engine 208 determines a second priority for image data based on image width and sorts the image data from the narrowest image to the widest image.

In one embodiment, the sort engine 208 determines a second priority for the symbolic data type based on characteristics of the symbolic data (e.g., the symbolic data is alphabetic or numeric). For example, the sort engine 208 determines that a small number has priority over a large number and sorts the symbolic data in an ascending numeric order.

Once the sort engine 208 determines the first priority and the second priority, the sort engine 208 determines an order, sorts the cells in the table in that order and sends the sorted table to the table generator 204. The table generator 204 updates the table with the sorted column and communicates with the user interface engine 212 to display the updated table to the user. As described above in FIG. 3F, the table generator 204 can communicate with the user interface engine 212 to display a table in an image mode or a symbolic mode in response to receiving a selection from a user (e.g., using the mode button 354). When the user chooses to display image data included in the image & symbolic data in the image mode, the image & symbolic data may be sorted by underlying symbolic data, and vice versa. For example, the user interface engine 212 generates graphical data for displaying the text "four" in the first three cells of a column as a result of sorting the column based on a user's sort request. The user interface engine 212 instructed by the table generator 204 presents the textual or symbolic number to the user because the user chooses to display the table in the symbolic mode. The sort engine 208 determines the order of the text "four" in the first three cells of the column based on the image data contained in each of the three cells, for example, based on histograms of the image data.

The filter engine 210 is software including routines for filtering a column of a table in response to receiving a filter request from a user. In one embodiment, the filter engine 210 is a set of instructions executable by the processor 240 to filter the column of the table. In another embodiment, the filter engine 210 is stored in the memory 245 and is accessible and executable by the processor 240. In either embodiment, the filter engine 210 is adapted for cooperation and communication with the processor 240 and other components of the IBDM server 106.

The filter engine 210 receives a filter request for a column of a table from a user via the controller 202, identifies filter criteria from the filter request, determines which cells in the column match the filter criteria and instructs the table generator 204 to generate a new table that matches the filter criteria. The table generator 204 updates the table with the rows containing cells that match the filter criteria. The table generator 204 communicates with the user interface engine 212 to present a user interface to generate graphical data for displaying the updated table to the user.

In one embodiment, the filter engine 210 identifies the filter criteria that are based on one or more data types. For example, the filter engine 210 identifies from a user's filter request that the user wants a column without empty cells and therefore determines a filter criterion to remove the rows containing cells with an empty value in a specific column.

In another embodiment, the filter engine 210 identifies the filter criteria that are related to characteristics of data. The characteristics of image data include, but are not limited to, image properties such as a size, width, height, histogram, brightness, principal color, stroke properties such as length, pen velocity or acceleration, classification features such as a group that has similar image data and other properties such as a yes or no image that represents a selected radio button or an unselected radio button. The characteristics of symbolic data include, but are not limited to, a type of symbolic data (e.g., alphabetic or numeric data). Typically, symbolic data is filtered or matched using a "regular expression" in a way that is well known by those familiar with the art (e.g., "^J[a-zA-Z]*" or "abc[012345]"). Symbolic data that is numeric in nature can be matched or filtered using mathematical expressions (e.g., ">10" or "<=5"). The filter engine 210 identifies the filter criteria based on the characteristics of data. For example, the filter engine 210 identifies from a user's filter request that the user wants to see handwritten names (e.g., image data) wider than 100 pixels and names (e.g., symbolic data) longer than 12 characters in a "Last Name" column of a table, and therefore determines a first filter criterion to remove the handwriting images <=100 pixels from the column and a second filter criterion to remove the printed names shorter or equal to 12 characters from the column. For the image & symbolic data included in the column, the filter engine 210 determines the filter criteria based on either image data or symbolic data contained in the image & symbolic data or both.

In one embodiment, the filter engine 210 receives a filter request created by a user. In another embodiment, the filter engine 210 communicates with the user interface engine 212 to provide a user interface with certain options. In one embodiment, the filter request includes one or more filter equations specified by a user to indicate the content in the column that the user wants to keep or remove. For example, a filter request includes a first filter equation for keeping image data that includes images wider than 100 pixels, a second filter equation for removing image data that includes less than 30% of non-white pixels, a third filter equation for keeping symbolic data that is true, a fourth filter equation for keeping symbolic data that starts with the letter "J," etc. The filter equations include, but are not limited to, regular expressions, logical expressions and arithmetic expressions.

In one embodiment, the filter engine 210 filters a column of the table based on a filter request. In another embodiment, the filter engine 210 receives a filter request to filter more than one column of the table. The filer engine 210 sends the results of filtering the column to the table generator 204. The table generator 204 updates the table and communicates with the user interface engine 212 to generate graphical data for displaying the updated table. In one embodiment, the filter engine 210 filters image & symbolic data in a column based on the symbolic data contained in the image & symbolic data and the user interface engine 212 displays the image data contained in the image & symbolic data based on a selection from a user, and vice versa.

The user interface engine 212 is software including routines for generating graphical data for displaying a user interface that includes a table. In one embodiment, the user interface engine 212 is a set of instructions executable by the processor 240 to generate the user interface. In another embodiment, the user interface engine 212 is stored in the memory 245 and is accessible and executable by the processor 240. In either embodiment, the user interface engine 212 is adapted for cooperation and communication with the processor 240 and other components of the IBDM server 106.

In one embodiment, responsive to a user of a user device 103 requesting the user interface, the user interface engine 212 retrieves information about the table from the table generator 204 or from data storage 250 and generates graphical data for displaying the table. For example, the user interface engine 212 provides a user interface to display a table in an image mode to a user in responsive to receiving a selection of the image mode from the user.

In another embodiment, the user interface engine 212 receives an updated table from the table generator 204 and generates graphical data for displaying the updated table to a user. In one embodiment, the table is updated by the table generator 204 based on a sort result from the sort engine 208 or a filter result from the filter engine 210. The user interface engine 212 generates a user interface to show the table sorted by a column of the table or the table with one or more rows having been eliminated.

In yet another embodiment, the user interface engine 212 generates a user interface for receiving a sort request or a filter request from a user. In one embodiment, the user interface engine 212 also communicates with the sort engine 208 or the filter engine 210 to provide graphical data for interacting with a user to create a sort request or a filter request. For example, the user interface engine 212 provides a drop-down menu for a user to create a sort request for sorting a column of a table.

Methods

Figure 4:
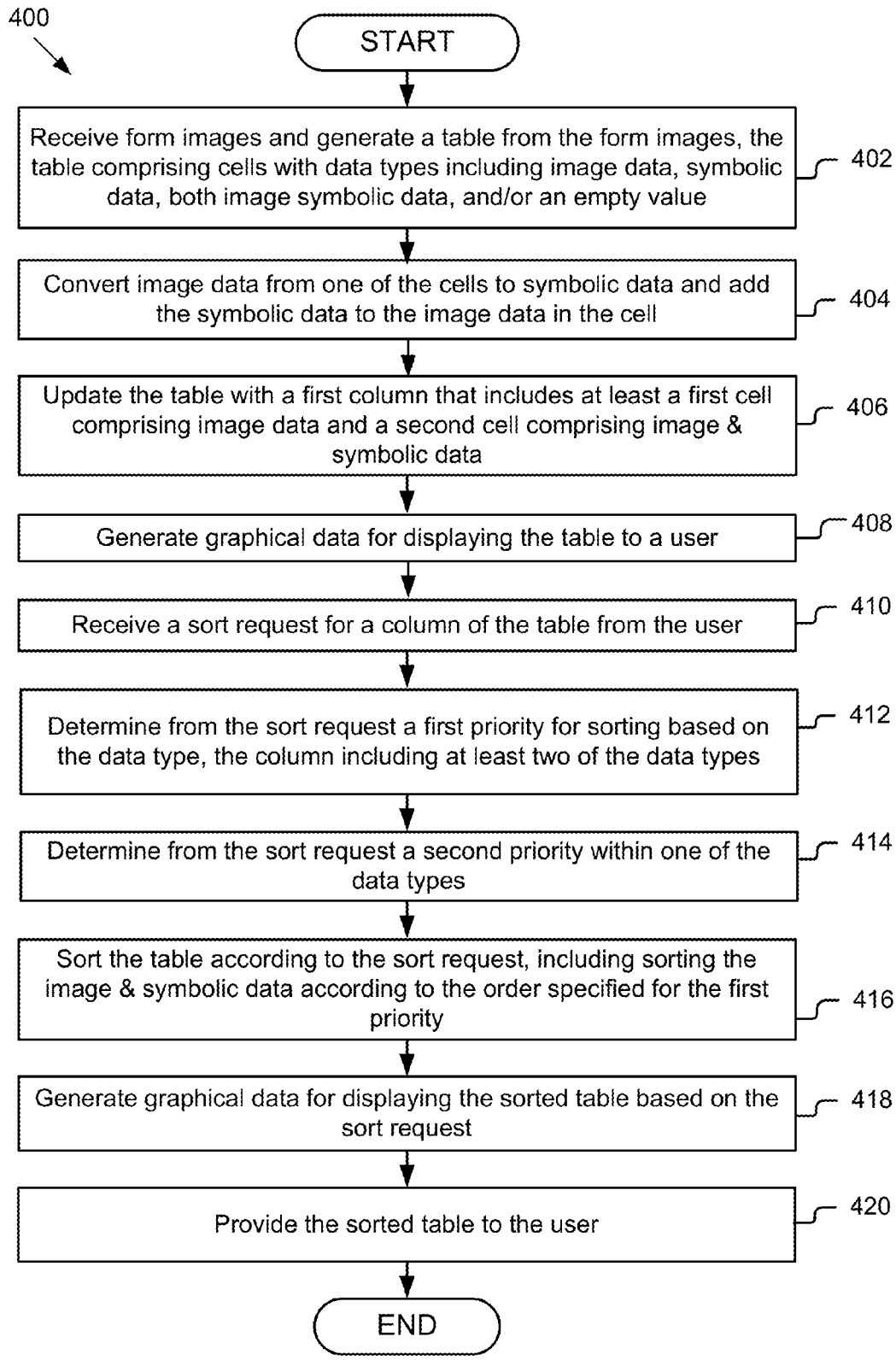
FIG. 4 is a flow diagram of one embodiment of a method for sorting a column of a table.
Figure 5:
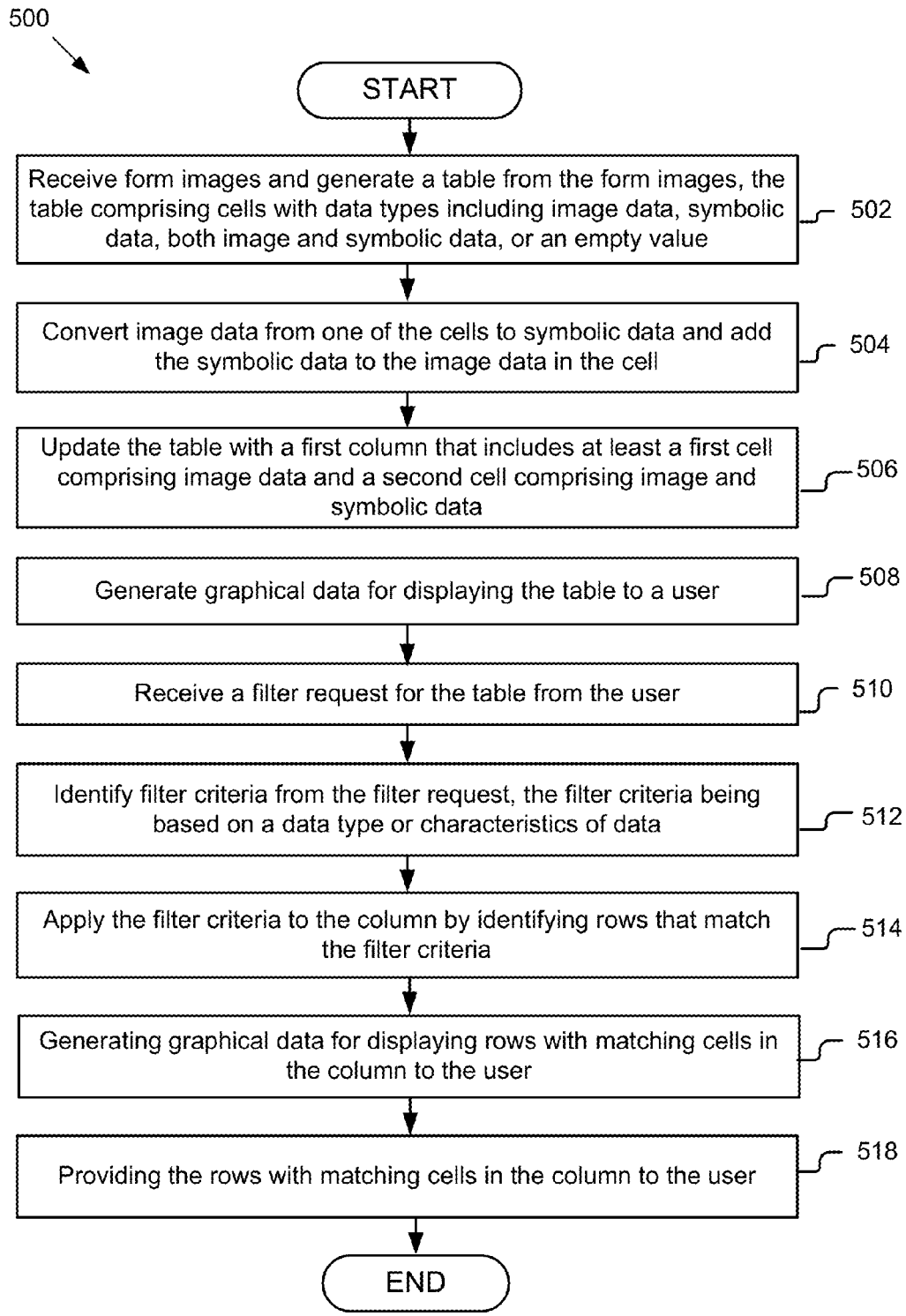
FIG. 5 is a flow diagram of one embodiment of a method for filtering a column of a table.

Referring now to FIGS. 4 and 5, the methods of the present embodiment of invention will be described in more detail. FIG. 4 is a flow diagram 400 that illustrates one embodiment of a method for sorting a column of a table. The IBDM server 106 includes a table generator 204, a symbolic representation module 206, a sort engine 208 and a user interface engine 212. The table generator 204 receives 402 form images from the portable computing devices 102 and generates a table from the form images, the table comprising cells with data types including image data, symbolic data, both image and symbolic data and/or an empty value. In one embodiment, the table generator 204 generates field images and label images from the form images and generates a table that includes the field images and label images.

The image data includes handwriting, objects embedded in the form (e.g., a check box), strokes and other media (e.g., a photo). The image data is provided by users in the form images that are used for generating the table. The symbolic data is stored as Unicode characters typically using UTF-8 or similar encoding. The symbolic data is included in the form images or generated by conversion of the image data in the table using an image converter 101 or the symbolic representation module 206. The image & symbolic data includes image data and symbolic data associated with the image data. The empty value indicates that users do not provide full information in the form images.

The symbolic representation module 206 converts 404 image data from one of the cells to symbolic data and adds the symbolic data to the image data in the cell. In one embodiment, the symbolic representation module 206 receives image data (e.g., strokes) in a column of a table, determines similarities among the image data in the column, classifies the image data in the column into K (e.g., one, two, three, . . . ) groups based on the similarities (e.g., by creating a hierarchical cluster), represents each group with classification data and uses the classification data as the symbolic data.

In another embodiment, the symbolic representation module 206 generates symbolic data corresponding to the image data using, for example, Optical Character Recognition (OCR), Optical Mark Recognition (OMR), intelligent character recognition (ICR), handwriting recognition, pattern recognition, etc. In yet another embodiment, the symbolic representation module 206 also transmits the image data included in a table to a user over the network 104 and the user manually converts the image data to symbolic data.

The table generator 204 updates 406 the table with a first column that includes at least a first cell comprising image data and a second cell comprising image & symbolic data. The table generator 204 receives symbolic data from the representation module 206, associates the symbolic data with the image data from which the symbolic data is generated and updates the table. The table generator 204 communicates with the user interface engine 212 to generate graphical data for displaying 408 the table to a user.

The sort engine 208 receives 410 a sort request for a column of the table from the user. The sort engine 208 determines 412 from the sort request a first priority for sorting based on the data type, the column including at least two of the data types. The sort engine 208 compares the priorities between data types of image data and symbolic data. If the image data type has a higher priority than the symbolic data, the sort engine 208 groups the image & symbolic data with the image data. If the symbolic data type has a higher priority than the image data type, the sort engine 208 groups the image & symbolic data with the symbolic data.

The sort engine 208 determines 414 from the sort request a second priority within one of the data types. In one embodiment, the sort engine 208 determines a second priority for the image data type based on image properties (e.g., width, height, brightness, color), stroke properties (e.g., length) and other properties (e.g., a check box is selected or unselected, which group the image data is classified into, etc.). In one embodiment, the sort engine 208 determines a second priority for the symbolic data type based on characteristics of the symbolic data (e.g., the symbolic data is alphabetic or numeric, ascending or descending).

The sort engine 208 sorts 416 the table according to the sort request, including sorting the image & symbolic data according to the order specified for the first priority. In one embodiment, the sort engine 208 determines an order, sorts the cells in the table in that order and sends the sorted table to the table generator 204. The table generator 204 updates the table and communicates with the user interface engine 212 to generate graphical data for displaying 418 the sorted table based on the sort request. The user interface engine 212 provides 420 the sorted table to the user via the communication unit 255.

FIG. 5 is a flow diagram 500 that illustrates one embodiment of a method for filtering a column of a table. The IBDM server 106 includes a table generator 204, a symbolic representation module 206, a filter engine 210 and a user interface engine 212. The table generator 204 receives 502 form images from the portable computing devices 102 and generates a table from the form images, the table comprising cells with data types including image data, symbolic data, both image and symbolic data and/or an empty value. The symbolic representation module 206 converts 504 image data from one of the cells to symbolic data and add the symbolic data to the image data in the cell. The conversion includes classifying the image data to generate the symbolic data. The table generator 204 updates 506 the table with a first column that includes at least a first cell comprising image data and a second cell comprising image and symbolic data. The table generator 204 communicates with the user interface engine 212 to generate graphical data for displaying 508 the table to a user.

The filter engine 210 receives 510 a filter request for the table from the user. In some embodiments, the filter request is for filtering data in a specific column of the table. The filter engine 210 identifies 512 filter criteria from the filter. The filter criteria are based on a data type or characteristics of data. In one example, the filter engine 210 identifies from a user's filter request that the user wants a column without empty cells and therefore determines a filter criterion to identify cells without an empty value to be included in the updated table. In another example, the filter engine 210 identifies from a user's filter request that the user wants to see handwritten names (e.g., image data) wider than 100 pixels and names (e.g., symbolic data) longer than 12 characters in a "Last Name" column of a table, and therefore determines a first filter criterion to identify cells with handwritten names wider than 100 pixels and a second filter criterion to identify cells with symbolic data longer than 12 characters.

The filter engine 210 applies 514 the filter criteria to the column by identifying rows that match the filter criteria. The filter engine 210 communicates with the user interface engine 212 to generate graphical data for displaying 516 rows with matching cells in the column to the user. The user interface 212 provides 518 the matching cells in the column to the user via the communication unit 255.

Examples of Sorting and Filtering a Table

Figure 6A:
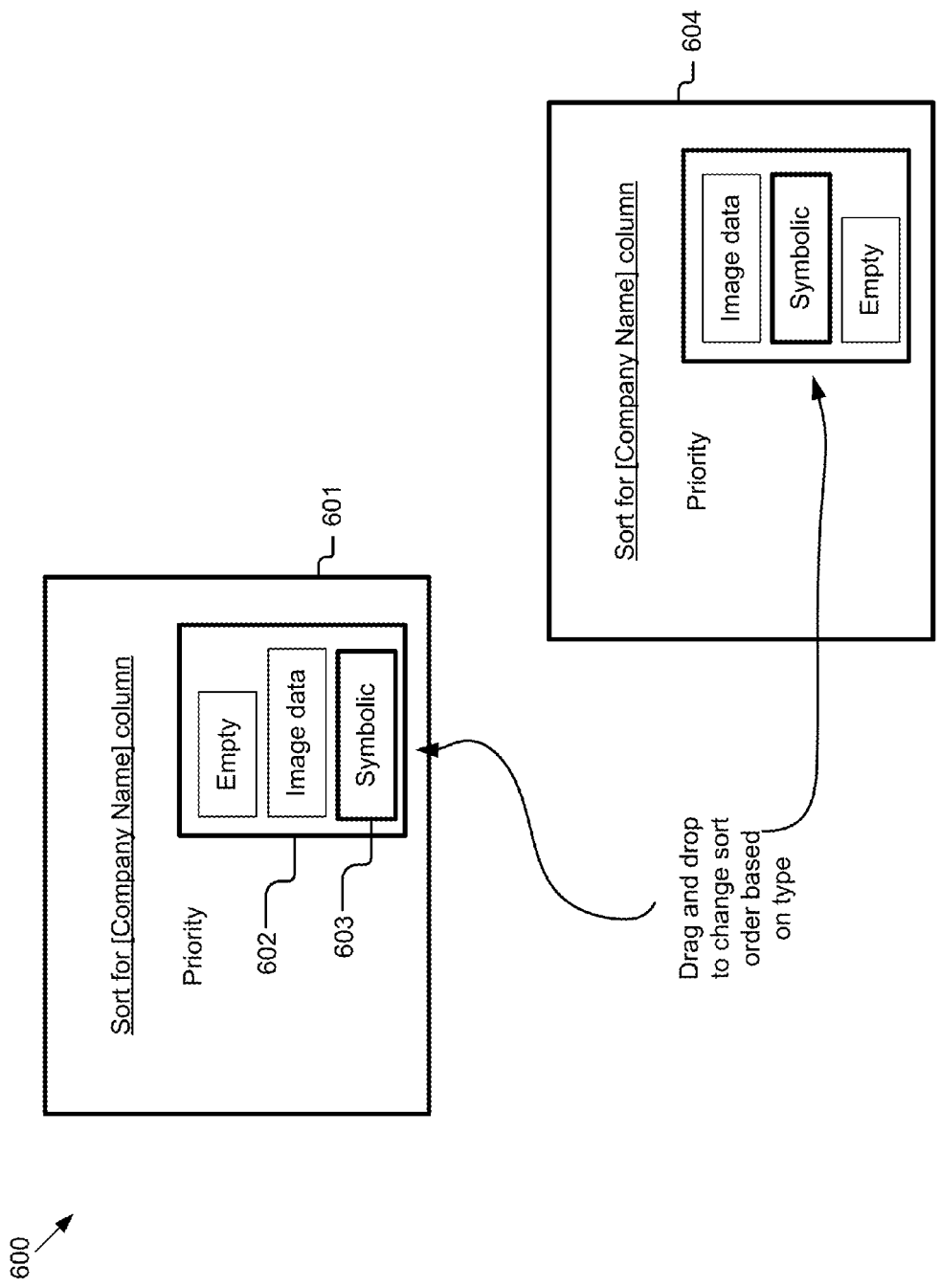
FIG. 6A is a graphic representation of an example user interface for specifying an order for the first priority.

FIG. 6A is an example of a graphic representation of a user interface 600 for setting the first priority for sorting a table based on the type of data. In the first dialog box 601, there is a list box 602 where the items can be re-ordered. Here, the list box 602 includes a first priority for the empty data type, a second priority for the image data type and a third priority for the symbolic data type 603. A user can drag and drop the data types to specify the sort order based on type. In this example, the user drags the symbolic box 603 from the third position to the second position as illustrated in the second list box 603. Similarly, the user dragged the empty data type from the first position to the third position and the image data type from the second position to the first position.

Figure 6B:
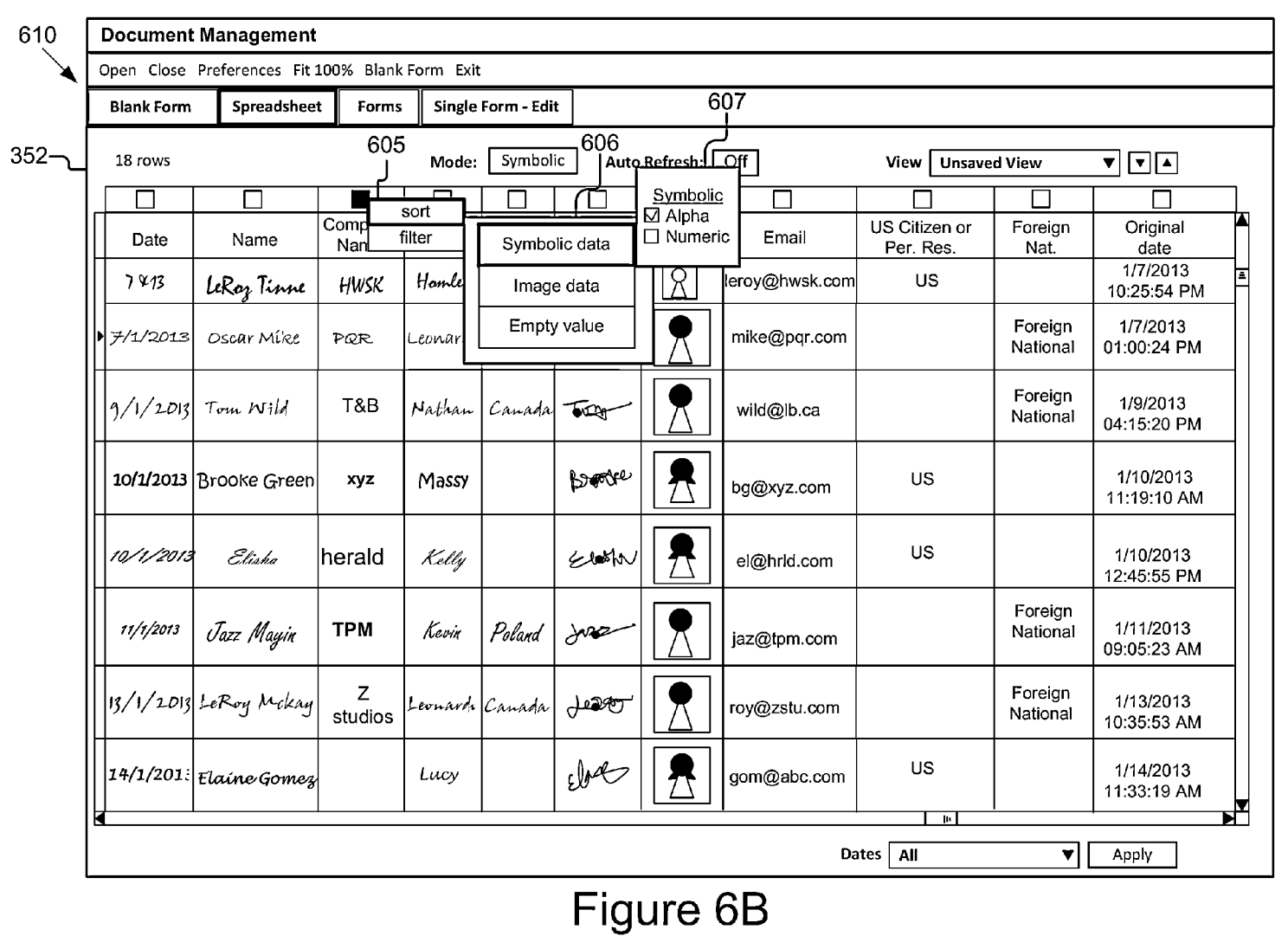

FIG. 6B is an example of a graphic representation of a user interface 610 displayed on a user device 103 that is generated by the user interface engine 212. In this example, the user interface 610 includes a table 352 that is generated by the table generator 204 and shown in FIG. 3F. The user interface 610 also includes a menu for a user to create a sort request for sorting the table 352. In this example, responsive to a user selecting the "Company Name" column for sorting, the user interface engine 212 provides a drop down menu for the user. The drop down menu includes a first menu list 605, a second menu list 606 and a third menu list 607. The user interface engine 212 generates graphical data for displaying the first menu list 605 to the user so that the user can select between sorting and filtering the column. Here, the user chose sorting. The user interface engine 212 then displays the second menu list 606 to the user to determine a first priority for data types of image data, symbolic data and an empty value. The user selects the order, for example, as described above with reference to FIG. 6A. Other mechanisms are possible, for example, the data types could be displayed with a number that the user specifies (e.g. one, two or three).

Initially the user selects sort from the first menu 605. A dialog is presented to the user, including a list box for choosing the primary ordering for the sort. Three items are presented, including "Image", "Symbolic" and "Empty". The user can drag the three items into the desired order to indicate the first priority as illustrated in FIG. 6A. The user can also select one of the items (e.g., double-click or right click with the mouse) and be presented with a third menu 607 of options. For "Symbolic" the user can choose to sort the information as alphabetic characters (e.g., "a", "1", "10", "9", "Abc", "abc") or as numeric characters (e.g., "1", "9", "10", "Abc", "abc"), optionally choosing ascending or descending and whether to ignore case ("abc"="ABC"). For "Empty" there are no additional options and for "Image", the user could be given the option to sort by image fill (percentage of dark or light pixels), image size, width or height, main color, image entropy, image file size, or a variety of other choices. The secondary choices provided to the user indicate the second priority for sorting or how to sort within the group.

From the user's selections in the second menu list 606, the sort engine 208 determines the order for the first priority. In this example, the first priority includes symbolic data, image data and an empty value in a descending order.

In response to receiving the user selections in the second menu list 606, the user interface engine 212 presents the third menu list 607 to the user for selecting the second priority for each data type. Here, the options in the second priority for symbolic data are between ordering alphabetically or numerically. In this example, the sort engine 208 orders symbolic data in an alphabetic order by clicking the checkbox next to "Alpha." Persons with ordinary skill in the art will recognize that the drop down menu may have other options or menu lists, for example, a fourth menu list includes options for a descending or ascending order for determining an order for sorting the column.

Figure 6C:
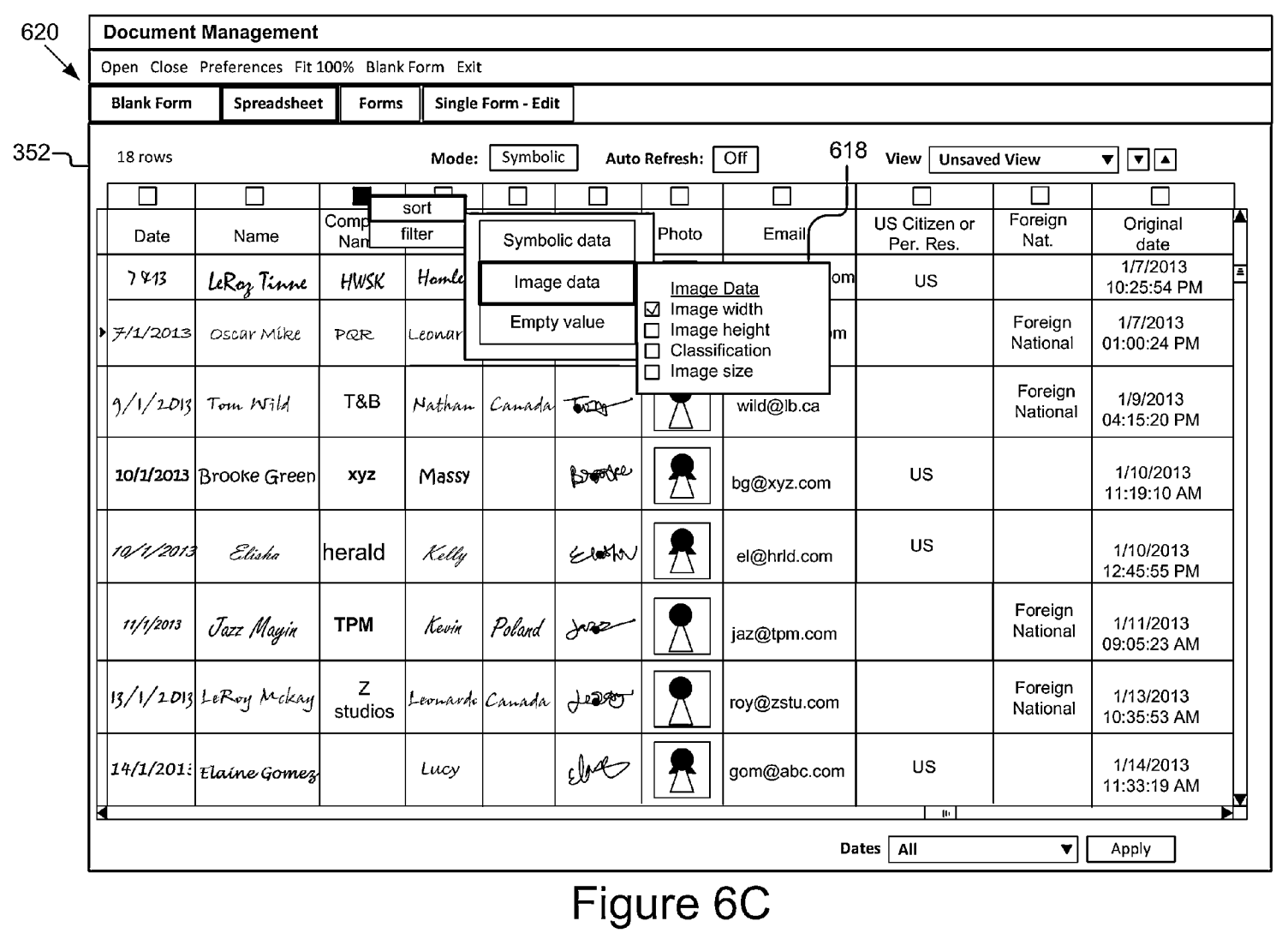

FIG. 6C is an example of a graphical representation 620 of sorting options in the second priority for image data. In this example, the order for the first priority still has symbolic data listed first. The second menu 618 specifies the second priority for image data. Here, the user has picked image width for the sorting criteria, where the other options are the image height, classification and image size.

Figure 6D:
FIG. 6D is an example of a graphical representation of the sort results after the first and second priorities are specified.

FIG. 6D is an example of a graphical representation 630 of the sort results after the first and second priorities are specified. As mentioned in FIG. 6B, the first priority for sorting data types had the following order: (1) symbolic; (2) image; and (3) empty cell. This means that the image & symbolic data was grouped with the symbolic data. Rows 1-5 631 include the symbolic data and the image & symbolic data. Rows 6-7 632 include the image data. The second priority for the symbolic data is alphabetical based on the company name column 634. As a result, the first row is for "herald," the second row is for "T&B," the third row is for "TPM," the fourth row is for "xyz" and the fifth row is for "Z studios." As mentioned in FIG. 6C, the second priority for sorting within the data type for the image data is based on image width for the company name column 634. As a result the row with "PQR" comes before the row with "HWSK." The row 633 with an empty cell for the company name is positioned last according to the order specified in the first priority.

Figure 7A:
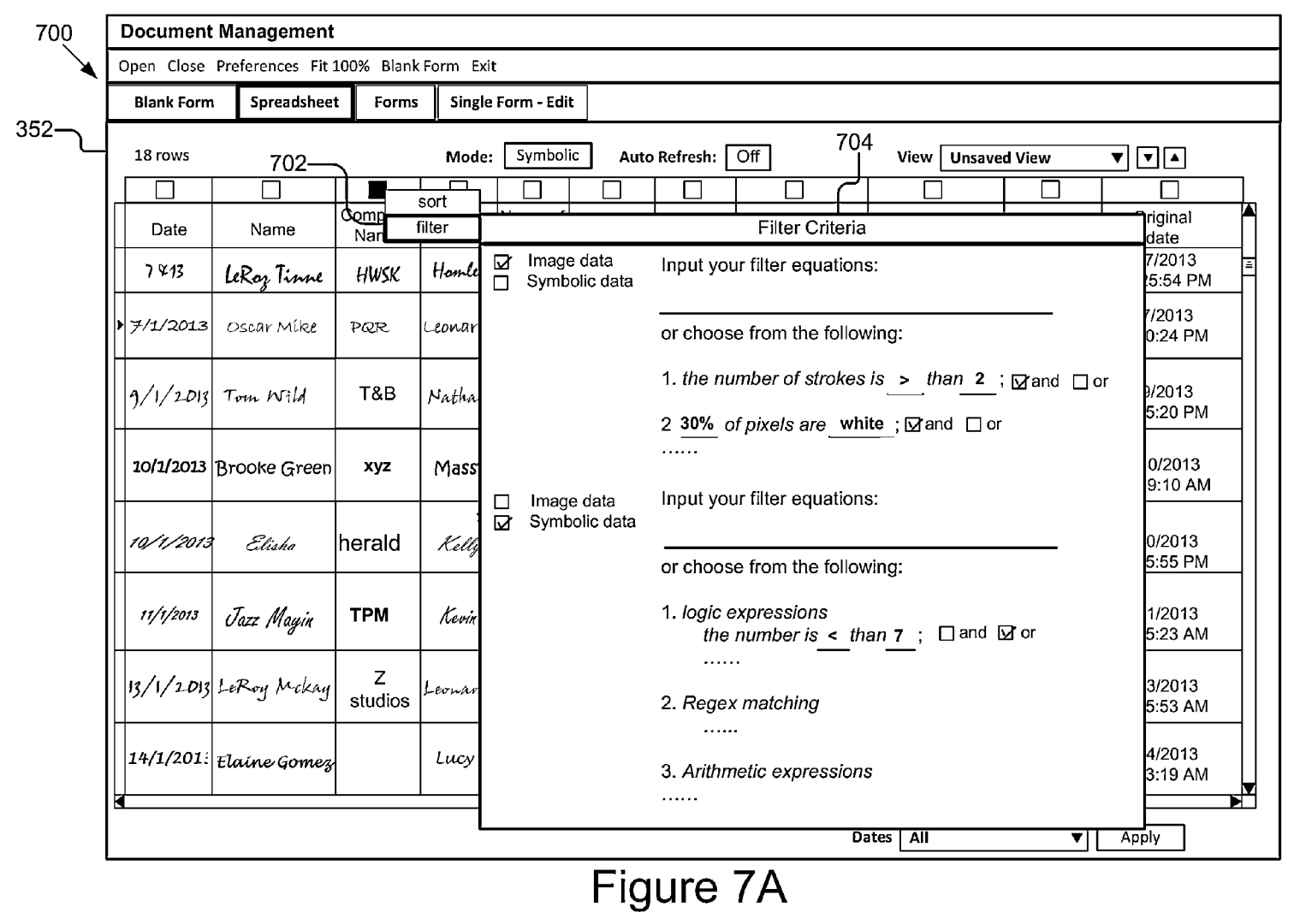

FIG. 7A is an example of a graphic representation of a user interface 700 displayed on a user device 103 that is generated by the user interface engine 212. In this example, the user interface 700 includes a table 352 and a menu for a user to create a filter request for filtering a column of the table 352. In this example, responsive to a user selecting the "Company Name" column for filtering, the user interface engine 212 provides a drop down menu for the user. The drop down menu includes a menu list 702 and a pop-up 704. The user interface engine 212 displays the menu list 702 to the user so that the user can select the option for filtering the column. The user interface engine 212 then provides the pop-up 704 to the user to create a filter request that includes filter equations. The user can input the filter equations or interact with the user interface 700 to generate the filter equations. The filter engine 210 determines filter criteria from the filter equations included in the filter request and filters the "Company Name" column based on the filter criteria.

Figure 7B:
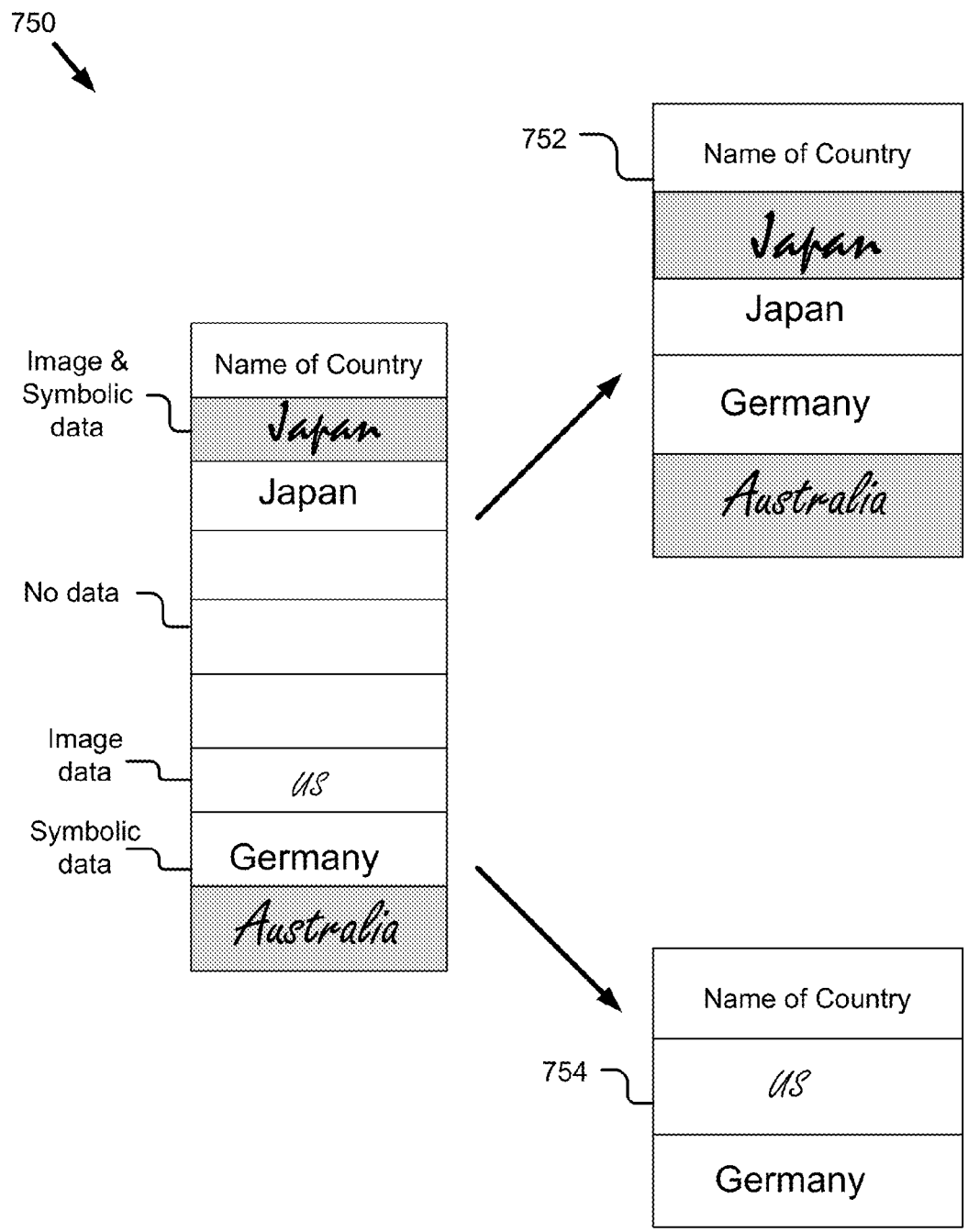
FIG. 7B is a graphic representation of example filtering results for filtering a column of a table.

FIG. 7B is an example of a graphic representation of a first filter result 752 and a second filter result 754 generated in response to receiving a first filter request and a second filter request for filtering a column 330. The filter engine 210 determines filter criteria from the first filter request, removes data types of image data and an empty value from the column 330 and includes only the symbolic data and image & symbolic data in the first filter result 752. The filter engine 210 also determines filter criteria from the second filter request, removes data types of image & symbolic data and an empty value from the column 330, filters out the symbolic data that starts with the letter "J," and includes the symbolic data "Germany" and the handwritten "US" in the second filter result 754.

Figure 8A:
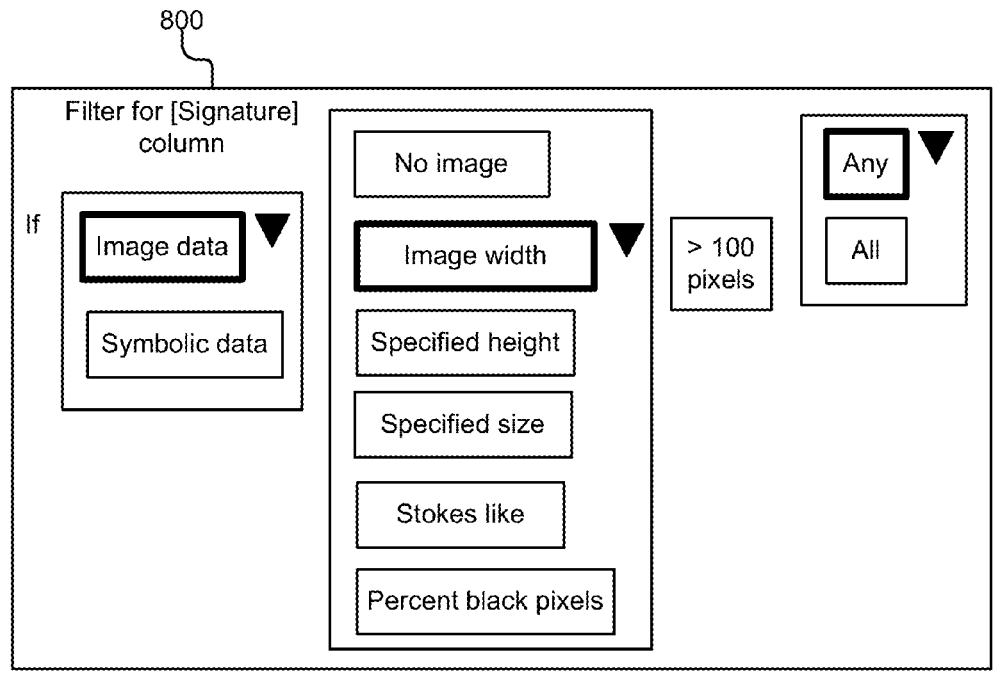
FIG. 8A is a graphic representation of an example user interface for filtering of image data.

FIG. 8A is a graphic representation 800 of example filtering of image data for the signature column. The graphic representation 800 includes options for specifying a filter between image data and symbolic data where the options for image data include having no image, specified width, specified height, specified size, a grouping of similar strokes (strokes like) and a percentage of black pixels. Here, the image width is specified as greater than 100 pixels. The fourth column allows the user to choose whether "all" criteria must be met or any of the criteria can be met. This is like the logical expression OR or AND. "Any" (e.g., OR) will allow cells that match only one of the criteria to match the filter. "All" (e.g., AND) requires that a cell match all of the criteria or the cell will be rejected.

Figure 8B:
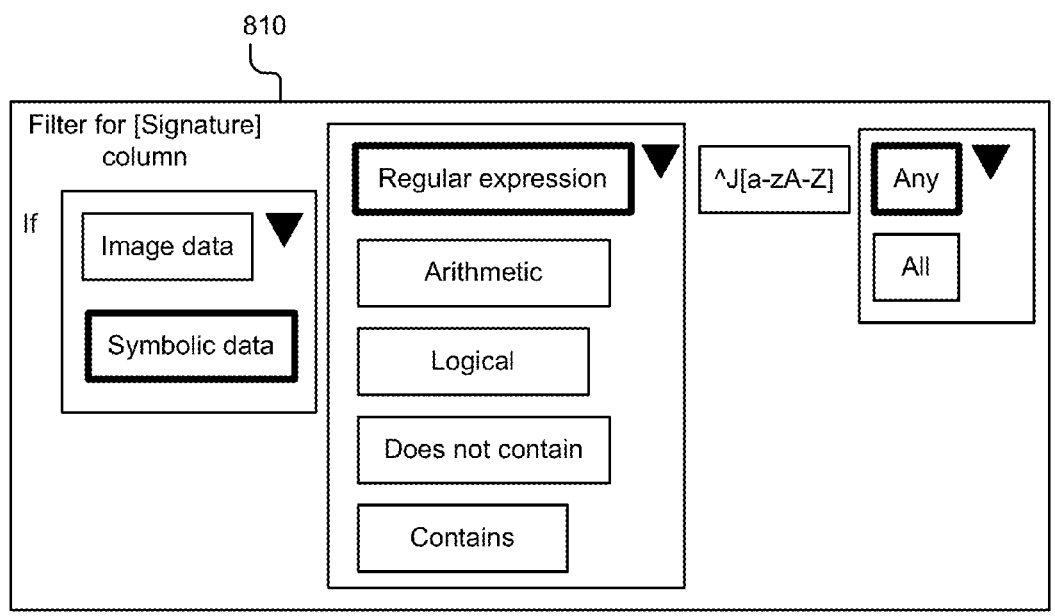
FIG. 8B is a graphic representation of an example user interface for filtering of symbolic data.

FIG. 8B is a graphic representation 810 of example filtering of symbolic data. The graphic representation 810 includes options for specifying a filter between image data and symbolic data where the options for symbolic data include a regular expression, arithmetic, logical, does not contain and contains. Here, the regular expression is "^J[a-zA-Z]." This means that the signature has to start with "J" and the other letters can be any uppercase or lowercase letters of the alphabet.

Figure 8C:
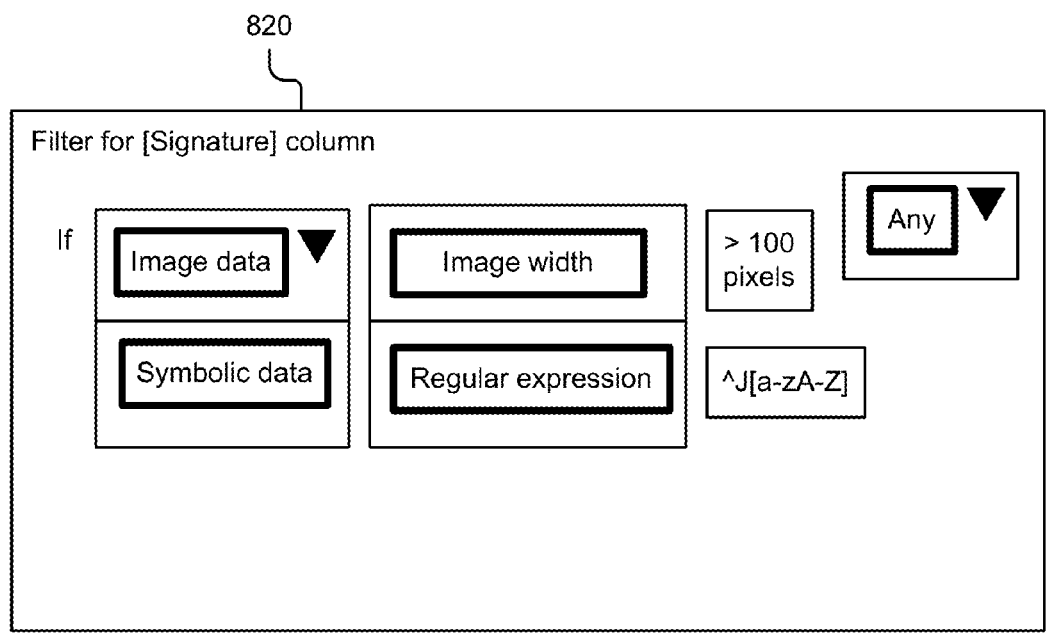
FIG. 8C is a graphic representation of an example user interface for filtering of both image data and symbolic data.

FIG. 8C is a graphic representation 820 of example filtering of both image data and symbolic data. Here, the signature image has to be wider than 100 pixels and have the expression "^J[a-zA-Z]."

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
receiving form images and generating a table from the form images, the table comprising a column including a plurality of cells, each cell being associated with one of a plurality of data types including image data, both image and symbolic data, and an empty value, wherein the data type including both image and symbolic data is generated by converting image data in a cell to symbolic data and adding the symbolic data to the image data in the cell, the column having at least two of the data types visible to the user;

receiving a request to update a view mode of the table, the request including a data type to be displayed by each cell associated with both image and symbolic data;

updating the view mode of the table by displaying one of image data and symbolic data based on the data type to be displayed in each cell associated with both image and symbolic data;

receiving a sort request for the column of the table from the user;

determining, using the one or more computing devices, from the sort request a first priority for sorting the cells of the column based on the data type of each cell;

sorting, using the one or more computing devices, the table according to the first priority, wherein the first priority specifies a data type order that determines a position for each data type in the column and wherein the first priority specifies a sort order for cells associated with both image and symbolic data where the data type to be displayed is different from the data type included in the first priority; and providing the sorted table based on the sort request to the user.

2. The method of claim 1, further comprising:
determining from the sort request a second priority within one of the visible data types; and
wherein sorting the table according to the sort request includes sorting based on the second priority.

3. The method of claim 1, wherein the view mode either an image mode or a symbolic mode.

4. The method of claim 1, wherein the data types further include symbolic data.

5. The method of claim 1, further comprising:
receiving a filter request for the column of the table from the user; and
filtering the table based on the filter request.

6. The method of claim 5, wherein filtering the column based on the filter request further comprises:
identifying filter criteria from the filter request, the filter criteria being based on a data type or characteristics of data;
applying the filter criteria to the column by identifying rows that match the filter criteria; and
providing the rows with matching cells in the table to the user.

7. The method of claim 1, wherein sorting the column further comprises sorting the image and symbolic data with the image data based on the sort request.

8. The method of claim 1, further comprising updating the table with a first column that includes at least a first cell comprising image data and a second cell comprising image and symbolic data.

9. A system comprising:
one or more hardware processors;
a controller stored on a memory and executable by the one or more hardware processors, the controller configured to receive form images;
a table generator executable by the one or more hardware processors, configured to:
generate a table from the form images, the table comprising a column including a plurality of cells, each cell being associated with one of a plurality of data types including image data, both image and symbolic data, and an empty value, wherein the data type including both image and symbolic data is generated by converting image data in a cell to symbolic data and adding the symbolic data to the image data in the cell, the column having at least two of the data types visible to a user;
receive a request to update a view mode of the table, the request including a data type to be displayed by each cell associated with both image and symbolic data;
update the view mode of the table by displaying one of image data and symbolic data based on the data type to be displayed in each cell associated with both image and symbolic data;
a sort engine executable by the one or more hardware processors, configured to:
receive a sort request for the column of the table from the user,
determine from the sort request a first priority for sorting the cells of the column based on the data type of each cell, and sort the table according to the first priority, wherein the first priority specifies a data type order that determines a position for each data type in the column and wherein the first priority specifies a sort order for cells associated with both image and symbolic data where the data type to be displayed is different from the data type included in the first priority; and
a communication unit executable by the one or more hardware processors, configured to provide the sorted table based on the sort request to the user.

10. The system of claim 9, wherein the sort engine determines from the sort request a second priority within one of the visible data types and wherein sorting the table according to the sort request includes sorting based on the second priority.

11. The system of claim 9, wherein the view mode is either an image mode or a symbolic mode.

12. The system of claim 11, wherein the data types further include symbolic data.

13. The system of claim 9, further comprising a filter engine, executable by the one or more hardware processors, for receiving a filter request for the column of the table from the user and filtering the table based on the filter request.

14. The system of claim 13, wherein filtering the column based on the filter request further comprises:
identifying filter criteria from the filter request, the filter criteria being based on a data type or characteristics of data;
applying the filter criteria to the column by identifying rows that match the filter criteria; and
providing the rows with matching cells in the table to the user.

15. The system of claim 9, wherein the sorting engine sorts the image and symbolic data with the image data based on the sort request.

16. The system of claim 9, wherein the table generator updates the table with a first column that includes at least a first cell comprising image data and a second cell comprising image and symbolic data.

17. A computer-implemented method comprising:
receiving form images and generating a table from the form images, the table comprising a column including a plurality of cells, each cell being associated with one of a plurality of data types including image data, both image and symbolic data, and an empty value, wherein the data type including both image and symbolic data is generated by converting image data in a cell to symbolic data and adding the symbolic data to the image data in the cell, the column having at least two of the data types visible to a user;

receiving a request to update a view mode of the table, the request to update the view mode including a data type to be displayed in each cell associated with both image and symbolic data; and updating the view mode of the table by displaying image data or symbolic data based on the data type to be displayed in each cell associated with both image and symbolic data;

receiving a sort request for the column of the table from the user;

determining from the sort request a first priority for sorting the cells of the column based on the data type of each cell;

sorting the table according to the first priority, wherein the first priority specifies a data type order that determines a position for each data type in the column and wherein the first priority specifies a sort order for cells associated with both image and symbolic data where the data type to be displayed is different from the data type included in the first priority;

receiving a filter request for the column of the table from a user;

identifying, using one or more computing devices, filter criteria from the filter request, the filter criteria being based on a data type or characteristics of data;

applying, using the one or more computing devices, the filter to the column by identifying rows that match the filter criteria; and providing the rows with matching cells in the column to the user.

18. The method of claim 17, further comprising:

determining from the sort request a second priority within one of the visible data types; and wherein sorting the table according to the sort request includes sorting based on the second priority.

19. The method of claim 17, further comprising:

updating the table with the column that includes at least a first cell comprising image data and a second cell comprising image and symbolic data.

20. The method of claim 17, wherein the image data is filtered according to having no image, an image width, a specified height, a specified size, stroke similarity and a percentage of black pixels.

* * * * *